(12) United States Patent
Garcia

(10) Patent No.: US 6,290,505 B1
(45) Date of Patent: Sep. 18, 2001

(54) BALLISTIC PERFORMANCE SIMULATOR

(75) Inventor: Ariel Federico Garcia, Waldorf, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/320,360

(22) Filed: Apr. 19, 1999

Related U.S. Application Data

(60) Provisional application No. 60/080,571, filed on Apr. 3, 1998.

(51) Int. Cl.[7] ............................. G09B 23/06; B64G 1/40; B64G 1/42; F02G 1/00; F02G 3/00
(52) U.S. Cl. ........................ 434/300; 244/172; 60/200.1
(58) Field of Search ................................. 434/118, 300, 434/302; 244/158 R, 172; 60/200.1, 721

Primary Examiner—John Edmund Rovnak
(74) Attorney, Agent, or Firm—Mark Homer

(57) ABSTRACT

Rocket/Missile flight simulation requires the thrust-versus-time profile of a rocket motor conditioned to a specific temperature. The use of program, preferably carried in an Excel spreadsheet, is disclosed to instantly generate interpolated thrust-versus-time profiles of any rocket motor, at any operating temperature. The spreadsheet is based on statistical data of total impulse and action time at the temperature extremes, and one thrust-versus-time curve. The spreadsheet works by proportionally expanding or contracting a given baseline thrust-versus-time curve until it fits a desired area under the curve and action time duration, which gives an excellent correlation between the thrust-versus-time curve from other firings (at various temperatures) to the curves generated by this spreadsheet. Thus, the program can be used to generate thrust-versus-time profiles for other rocket motors with minimum amount of time and data required.

3 Claims, 5 Drawing Sheets

Booster B (composite propellant)

BALLISTIC PERFORMANCE SIMULATOR

CROSS-REFERENCE TO RELATED APPLICATIONS

This application claims the benefit of U.S. Provisional Application No. 60/080,571, filed Apr. 3, 1998.

BACKGROUND OF THE INVENTION

1. Field of the Invention

This invention relates to flight simulation of rocket motors by interpolating between various values of known data on a computer to derive good approximations of the thrust-versus-time characteristics of motors for ambient conditions under which they have not been tested.

2. The Prior Art

Rocket/Missile flight simulation requires the thrust-versus-time profile of a rocket motor conditioned to a specific temperature. Sometimes the preferred simulation is with an average performance motor and other times it is with a statistically high or low ballistic performance. Actual rocket motor performance data is usually generated at the specification temperature extremes during lot acceptance testing with very little data available at ambient temperature, where most of the flight simulations are conducted. Additionally, rocket motor ballistic traces are typically confidential which makes getting and transferring them a tedious process.

SUMMARY OF THE INVENTION

The inventor has discovered how to calculate very rapidly the predicted thrust-versus-time profile of a rocket motor by assuming that the general shape of a profile is standard over a wide range of tests, and calculating the entire profile by calculating a few points on the profile, then stretching or shrinking the profile along its axes to force the general profile to fit the few calculated points.

DESCRIPTION OF THE PREFERRED EMBODIMENT

Figure 1:
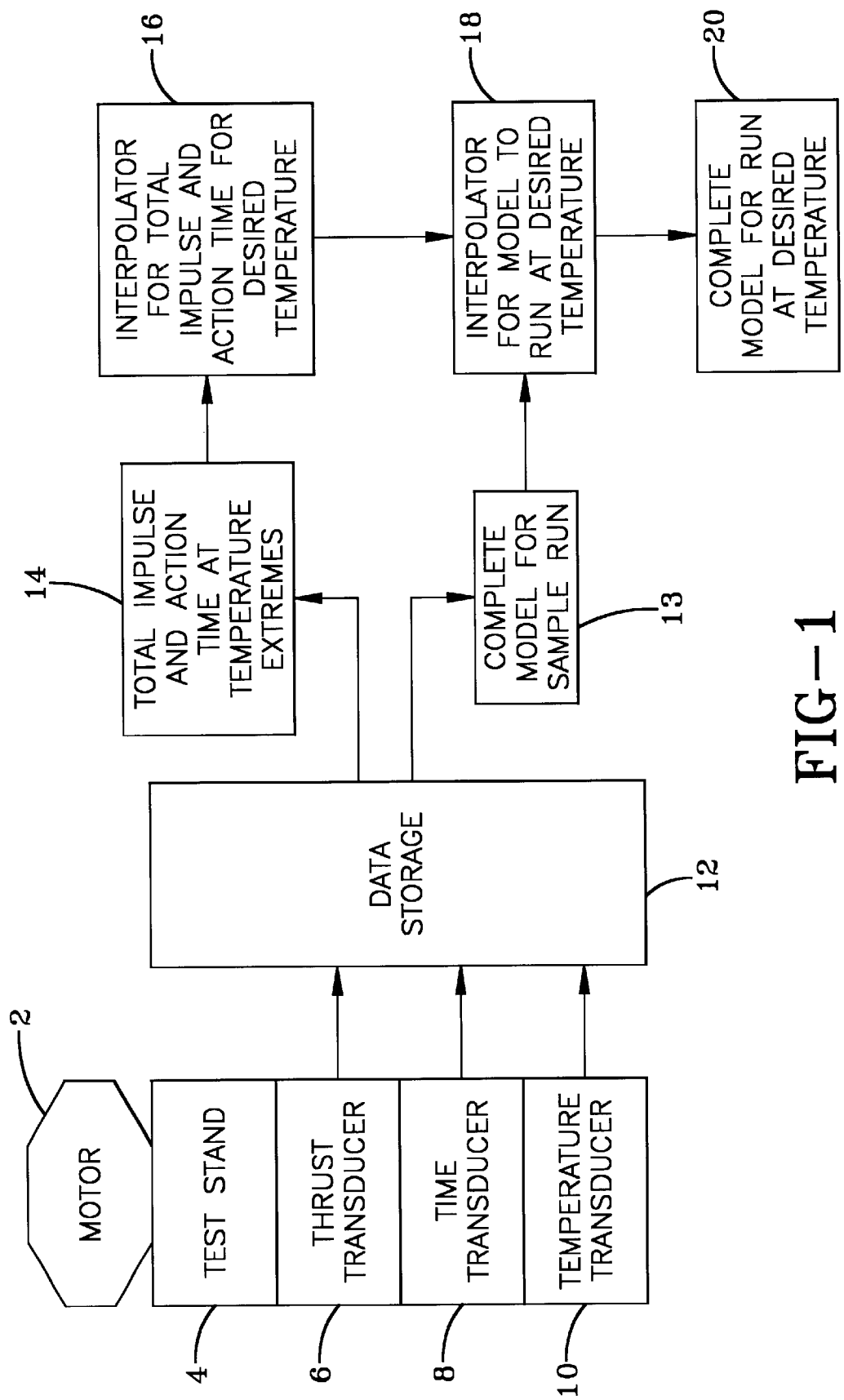
FIG. 1 is a block diagram of the invention.

The preferred embodiment uses an Excel spreadsheet that can be used to instantly generate interpolated thrust-versus-time profiles of any rocket motor, at any operating temperature. The spreadsheet is based on statistical data of total impulse and action time at the temperature extremes, and one thrust-versus-time curve. The spreadsheet works by proportionally expanding or contracting a given (baseline) thrust-versus-time curve until it reflects a desired area under the curve and action time duration. This approach was validated by comparing the thrust-versus-time curve from other firings (at various temperatures) to the curves generated by this spreadsheet. The results showed an excellent correlation between actual data and the curve generated by the spreadsheet. This spreadsheet can be used to generate thrust-versus-time profiles for other rocket motors with minimum amount of time and data required.

Flight simulation is continually performed over the life of many vehicles and it typically relies on rocket motor performance data obtained during production. This presents some problems which are quite similar regardless of the system in question. For example:

1) Flight simulations need average performance data at ambient temperature and this is rarely available. The vast majority of rocket motors are tested at the extreme operating temperature limits (hot and cold). Average performance also means average for both total impulse and action time. The odds on having exactly the average performance on both of these parameters are not high. The database would have to be searched to find such motor.

2) The statistical range (upper and lower limits) of motor performance at ambient temperature is frequently desired also. The most commonly desired performance is at the ±3 sigma level and this is rarely available either, especially at ambient temperature.

3) The user does not like to wait for information. Unfortunately, specific ballistic information is frequently classified and it takes time to obtain it.

4) The current way of obtaining a +3 sigma performance for example, is to run an expensive, custom-made, proprietary, confidential ballistic model. These models are not geared to generate ballistic performance based on total impulse or action time. As input they use propellant burn rate as a function of pressure, nozzle-throat diameter, throat erosion rates as a function of pressure, web burn-back profiles, temperature conditioning, and propellant density, among others. Within the acceptable tolerances, these parameters will have to be chosen by trial and error in order to end up with the desired sigma value of performance in terms of total impulse and action time, which are the parameters needed for flight simulation. It takes time to get to the right answer this way. Running these complicated models cost money. Additionally, as more data arrives during production, the calculation may need to be repeated to recalculate trajectory performance because of new production trends or design changes.

To solve those problems, the author inventor created an easy-to-use computer model that can be set up and used directly by flight simulation analysts. Once it is set-up for a specific motor, additional simulations can be done for that motor without the need for more data calls. The ballistic performance generator is easy to set up and easy to use, easy to update, and it provides the needed results (thrust-versus-time digital data) instantly, without iterations. This model works only for motors that are in production because it is based on empirical data of total impulse and action time. It is important that the user knows the relationship between total impulse and action time for the rocket motor in question. It is suggested that total impulse versus action time for both hot and cold performance be plotted on one chart. That way, the user can identify the boundaries of the rocket motor performance, i.e., what is within family and what is not.

In general, the shape of the thrust-versus-time curve for composite-propellant-based rocket motors changes little with motor conditioning temperature. When a hot and a cold firing are plotted together, the curves look stretched either horizontally or vertically (one relative to the other) but the general shape of the curve seems unchanged. Usually, each rocket motor design has a unique shape of the thrust-versus-time curve. The model presented here exploits that characteristic to yield an easy-to-use, analysis tool.

The ballistic model consists of an Excel file or "workbook" with four spreadsheets (4 pages). The contents of these four spreadsheets are shown in detail in the tables which form a part of this specification. The pages are named as follows:

Page 1: MODEL (technical heart of the model)

Page 2: RUN-PRGM (part of user's manual)

Page 3: SET-IT-UP (part of user's manual)

Page 4: VALIDATE (part of user's manual)

The first thing the user would do is set up the model to represent the rocket motor that will be used in the flight simulations. To do this, go to page 3, i.e., SET-IT-UP. This is where the model is set up to represent a particular motor.

Page 3: SET-IT-UP: The data required to set-up this model for a specific rocket motor is entered in page 3. The data the user has to provide is shown below. DATA REQUIRED:

| RM FAMILY TEMPERATURE | 1 SIGMA TOT IMP | 1 SIGMA ACT TIME | AVG TOT IMP | AVG ACT TIME |
|---|---|---|---|---|
| 120 | 216 | 0.258 | 35519 | 4.908 |
| 0 | 222 | 0.236 | 34400 | 5.549 |
| 28 | CALC.# | CALC.# | CALC.# | CALC.# |
| SAMPLE RUN | | | 35909 | 4.503 |

The cells that have been filled with numbers (above) contain the data that the user has to provide. The numbers are just an example for one rocket motor. The cells stating "CALC.#" are cells with a formula, indicating those numbers will be calculated by the spreadsheet based on the temperature given (in that case, 28° F.). The calculation is based on linear interpolation between the extreme temperatures.

Besides these values, the only other thing required to set the model up is one static firing thrust-versus-time profile. That too goes on this page. The total impulse (calculated based on the area under the curve defined in the motor specification) and action time for the baseline firing, have to be known and written in the corresponding shaded cells (see it below). The thrust-versus-time digital data is typically long, over 100 numbers, and for that reason it ought to be copied and pasted (to save time) instead of writing each number individually.

Many static firings end up with 2,000 to 4,000 numbers. If the thrust-versus-time profile has more than 250 numbers, the data ought to be reduced because the spreadsheet was not written to plot everything if there are more than 250 rows of data for the baseline static firing. A program can be run to remove every other row of data every time it is used. This approach does not change the overall performance—it was tested many times.

Warning! DO NOT CUT AND PASTE ballistic performance from one file to this spreadsheet! . . . COPY and paste instead of CUT and paste. If the user CUTs and pastes, that will ruin the formulas in the spreadsheet. Copy and paste will not ruin the model. The section of the spreadsheet pertaining to the baseline static firing data is located below the section shown before. See it below.

SAMPLE RUN DATA 35909 TOTAL IMPULSE OF THE SAMPLE RUN 5.503 TOTAL ACTION TIME OF SAMPLE RUN

| TIME | THRUST | TOT-IMP |
|---|---|---|
| 0 | 0 | 0 |
| 0.04 | 7500 | 150 |
| 0.08 | 5500 | 410 |
| 0.12 | 4600 | 612 |
| 0.16 | 4400 | 792 |
| 0.2 | 4538 | 971 |
| 0.24 | 4655 | 1155 |
| 0.28 | 4646 | 1341 |

Again, the only input required from the user will go on the underlined cells, only on the underlined cells. The rest of the thrust-versus-time data input (beyond 0.28 second) was not shown in order to save space. Once the program is set up to simulate a new motor, the user does not have to go to page 3 again unless basic performance of the rocket motor changes in the future, i.e., after production data indicates a change in the historical behavior. If this happens, all the user has to do to update the model is go to the cell in question (average total impulse hot for example) and replace the number with the latest value. To validate the model will take another 30 minutes. That is explained next.

Page 4. VALIDATE: This page is used to validate the program. This is done right after setting it up in order to have a visual idea of how accurate the new ballistic model really is. If the static firing data (sample run) used in page 3 to set up the model came from a cold firing, then the way to validate the model would be to find static firing data generated at the hot temperature, identify the total impulse and action time for that particular firing and use those numbers as input to page 4, to let the model generate its own prediction. The model (in page 4) would plot both its prediction and the actual firing at the hot temperature. The user can have a good idea of the accuracy of the model by seeing the difference between the actual firing and the model prediction. If the model is successful in predicting a hot firing using cold static firing ballistic data as a baseline, it will work well at ambient temperatures, provided there is constant temperature sensitivity. Having data at ambient temperature firings is needed to verify this. Degree of success is defined by how good a correlation exists (verified visually) between the predicted performance and the actual firing. This is explained in more detail in a later part of this specification (Results and Discussions). If the data used as baseline for the model came from a hot firing, then the user should find digital data on a cold firing to validate the model across the temperature range. Always validate the model with data from the opposite extreme in operating temperature. This is done to make sure the shape of the curve is essentially the same across the operating temperature range.

Again, remember, never cut and paste data on the spreadsheet, but instead COPY and PASTE. Cut and paste will change the equations in the computer program because it eliminates cells from those equations. Once the program is validated, the user does not have to deal with pages 1, 3 or 4 again. All the user will deal with from then on, will be page 2 (RUN-PRGM).

Page 1: MODEL: This page is the ballistic model itself—the linear interpolator. It works by linearly stretching a given curve (this maintains the same shape of the ballistic curve) until the curve has the desired horizontal length (action time) and the desired area under the curve (total impulse).

For example, suppose the user desires to have the thrust-versus-time curve of a rocket motor that reflects a −2 sigma value of performance at 28 degrees. To avoid confusion with the minus sign in "−2 Sigma", that is referred to as the "lower 2 sigma" value. That is defined as two things, meaning the lower 2 sigma values for both total impulse and action time. The model can predict these two parameters (total impulse and action time) independently. However, this example targets both of these at the lower two sigma value. To obtain that, the user first needs to know the total impulse and action time of such a motor. This is obtained in two steps. First find out (assuming Gaussian distribution) what is the lower 2 sigma value for total impulse and action time at each one of the extreme temperatures (hot and cold).

TI (lower 2 sigma) hot=Avg TI hot−2 SGM TI hot

TI (lower 2 sigma) cold=Avg TI cold−2 SGM TI cold

Where:

TI (lower 2 sigma) hot=Total Impulse at the −2 Sigma value hot

Avg TI hot=Average Total Impulse hot

2 SGM TI hot=2×(1 sigma value of total impulse) hot

TI (lower 2 sigma) cold=Total Impulse at −2 Sigma value cold

Avg TI cold=Average Total Impulse cold

2 SGM TI cold=2×(1 sigma value of total impulse) cold

Second, linearly interpolate between these two values [TI (lower 2 sigma) cold and hot] to find the lower 2 sigma value at the desired motor temperature (DMT).

$$TI(\text{lower 2 sigma})@DMT = TI(\text{lower 2 sigma})\text{cold} + \frac{[TI(\text{lower 2 sigma})\text{hot} - TI(\text{lower 2 sigma})\text{cold}]}{(\text{hot} - \text{cold temperature})}[DMT - \text{cold temp.}]$$

Where:

DMT=Desired Motor Temperature=In this case . . . 28 degrees F.

TI(lower 2 sigma)@DMT=lower 2 sigma value of Total Impulse at the desired motor temperature.

Then repeat this process for the action time with one exception. On rocket motors, the higher performance on action time is not defined as the larger number. The smaller the number for action time, the higher the performance. For that reason, in calculating sigma values, use the opposite sign. See it below:

AT(lower 2 sigma)hot=Avg AT hot+2 SGM AT hot (notice it is +2 SGM, not −2 SGM as before)

AT(lower 2 sigma)cold=Avg AT cold+2 SGM AT cold

Where:

AT (lower 2 sigma) hot=minus 2 sigma value for action time hot

Avg AT hot=Average action time hot

2 SGM AT hot=2×(1 sigma value of action time) hot

AT(lower 2 sigma)cold=minus 2 sigma value for action time cold

Avg AT cold=Average action time cold

2 SGM AT cold=2×(1 sigma value of action time) cold

Second, linearly interpolate between these two values [AT (lower 2 sigma) cold and hot] to find the lower 2 sigma value at the desired motor temperature (DMT).

$$AT(\text{lower 2 sigma})@DMT = AT(\text{lower 2 sigma})\text{cold} + \frac{[AT(\text{lower 2 sigma})\text{hot} - AT(\text{lower 2 sigma})\text{cold}]}{(\text{hot} - \text{cold temperature})}[DMT - \text{cold temp}]$$

Where:

DMT=Desired Motor Temperature

AT (lower 2 sigma) @ DMT=minus 2 sigma value of action time at the desired motor temperature.

Now comes the part where the model transforms the digital data of thrust-versus-time of a particular rocket motor into the thrust-versus-time profile of the same kind of rocket motor at a different temperature or different performance level. Performance is defined here by two parameters, i.e., total impulse and action time. To do that, take the digital data which usually comes in two columns (Time, Thrust), and multiply each value on the time column by a factor. Likewise, also multiply each value in the thrust column by another factor. This gives another thrust-versus-time curve that will be representative of that particular motor performance (defined by total impulse and action time).

The values on the time column are multiplied by the factor $$\frac{(\text{Action time of desired performance})}{(\text{Action time of sample run})}$$

in the equation which follows:

$$\text{Time value for desired performance} = \text{Time values of sample run} \times \frac{(\text{Action time of desired performance})}{(\text{Action time of sample run})}$$

That means each one of the values of time (on the thrust-versus-time ballistic trace) of the sample run is being multiplied by that factor, and that new value goes on the new ballistic trace of the desired performance.

Likewise, each thrust value of the sample run is multiplied by the factor $$\frac{[AT \text{ sample run} \times \text{Total Impulse of desired performance}]}{[\text{Total Impulse sample run} \times AT \text{ of desired performance}]}$$

in the equation which follows to get the thrust values of the desired performance.

$$\text{New Thrust value} = \text{Thrust value of sample run} \times \frac{[AT \text{ sample run} \times \text{Total Impulse of desired performance}]}{[\text{Total Impulse sample run} \times AT \text{ of desired performance}]}$$

where "AT" stands for Action Time

In summary, what the model does is to determine by linear interpolation what the total impulse and the action time are for the desired performance and once those is known, it takes the thrust-versus-time digital data from a regular firing (sample run), and generates another set of thrust-versus-time data by multiplying each value on the time column by a factor and does the same with the thrust column (except that a different factor is used for that one). This produces another set of thrust-versus-time data which has the same shape of the curve and is representative of the performance flight simulation people look for. Predictions using this approach have been verified to be very accurate and representative of actual rocket motor behavior.

A block diagram of what is happening is shown in FIG. 1. Referring to FIG. 1, a rocket motor 2 is mounted on a test stand 6 to obtain initial data. A thrust transducer 6, a time transducer (action time clock) 8 and a temperature transducer 10 for measuring motor temperature all feed their data into some form of data storage 12. Although the temperature transducer 10 is illustrated for convenience as closely associated with the test stand, in practice the temperature would be measured in a temperature-conditioning chamber where the motor is kept until mounted on the test stand. On this stand, the rocket motor is test fired at a specified motor temperature, and the complete thrust-versus-action-time profile is plotted 13 for at least one motor temperature. The motor is also test fired at extremely high and extremely low temperatures to obtain values 14 of action time of the motor and total impulse of the motor (the integral of the thrust over the action time). Extremely high and extremely low temperatures are the specification extreme temperatures over which the motor is ordinarily expected to be operable.

When it is desired to obtain a model or profile of the thrust-versus-time operation of the motor in some chosen intermediate temperature, it is necessary to first figure out what are the values for total impulse and action time of the particular performance specified (average, +3 sigma, whatever). Once that is known, the simulator proceeds to interpolate 16 the known values (total impulse and action time) between the two extreme temperatures, solving for the desired (chosen) temperature. This will render the true values of total impulse and action time for the chosen temperature and desired performance level. The thus obtained total impulse and action time values are used to force-fit 18 the complete model for the sample run to these values to obtain a good approximation of a complete model at 20 the chosen temperatures.

Figure 2:
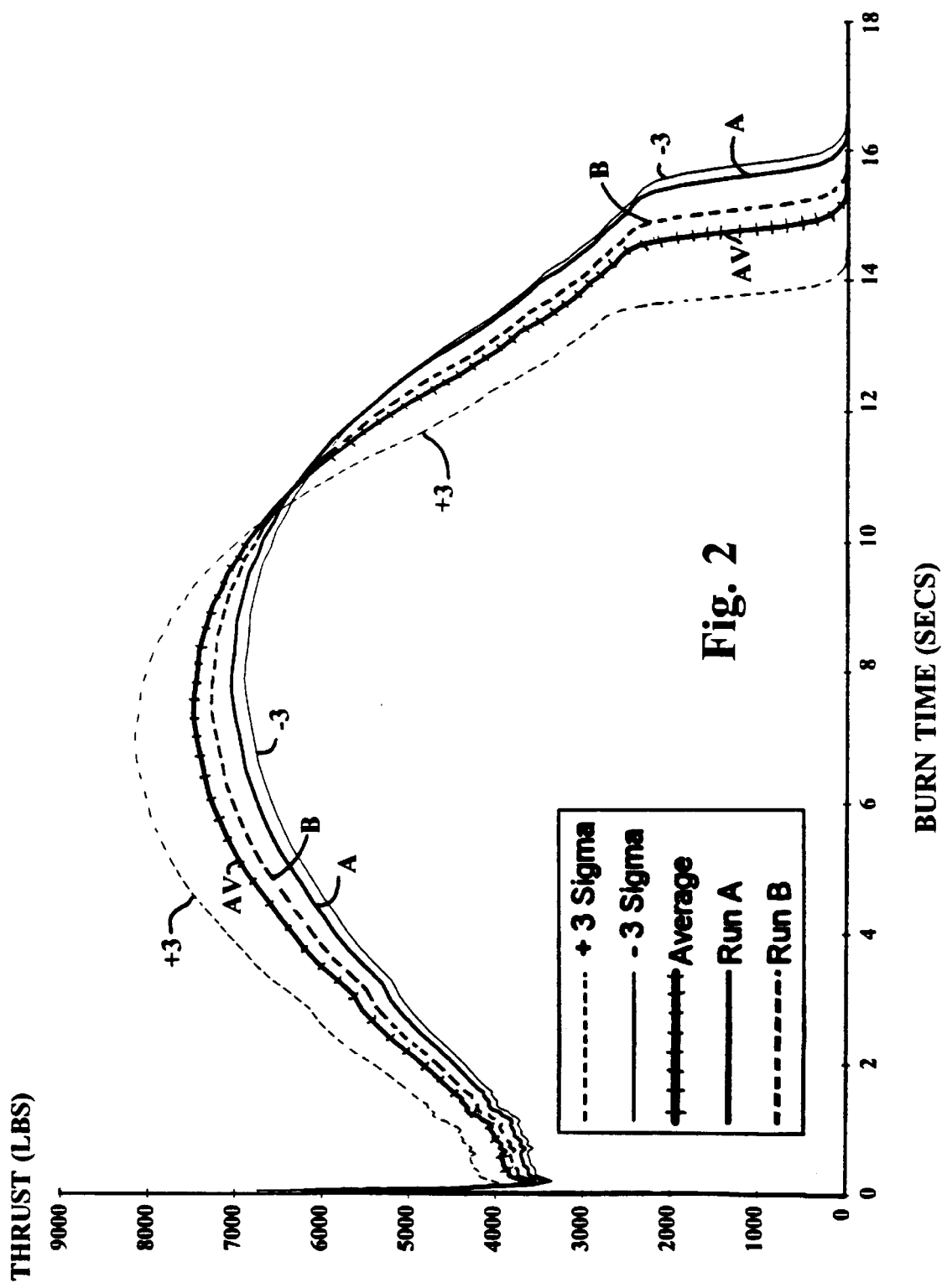
FIG. 2 is a thrust-versus-time curve for two firings (RUN A and RUN B) as derived in the RUN PROGRAM sheet of the preferred embodiment spreadsheet.

Page 2: RUN-PRGM: The user operates the program from this page. Here is where the desired performance is specified. This page provides graphical representation of the average and ±3 sigma values of the rocket motor performance at the desired temperature and the specific performance called out by the user. This gives the user a visual indication of how the specified performance fits relative to the family history. This page also provides the digital values for thrust versus time for one or two given runs specified by the user (RUN A and RUN B). The graphical representation on page 2 (RUN-PRGM) is shown in FIG. 2.

That shows the location of Run A and B relative to the family history at that particular temperature. The digital values for thrust versus time are what an analyst would need as input for a desired systems simulation model. These two runs (RUN A and RUN B) are established by the user by calling out the motor conditioning temperature (for both runs) and the standard deviations (sigma values), for both total impulse and action time (for each run). Up to two runs can be generated at one time (RUN A and RUN B). Both will run at the same temperature as indicated by the user.

The data specifying motor performance goes in the shaded cells of page 2 (RUN-PRGM). The spreadsheet looks like this:

| | | |
|---|---|---|
| MOTOR CONDITIONING TEMPERATURE FOR RUNS A AND B | ----> | 28 |
| RUN A ASSIGN TOTAL IMPULSE STD DEV FOR RUN A (AVG = 0) | ----> | 1 |
| ASSIGN ACTION TIME STD DEV FOR RUN A (AVG = 0) | ----> | 1 |
| | | Sigma |
| RUN B ASSIGN TOTAL IMPULSE STD DEV FOR RUN B (AVG = 0) | ----> | −1 |
| ASSIGN ACTION TIME STD DEV FOR RUN B (AVG = 0) | ----> | −1 |

The standard deviation specified is typically between +3 and −3. A standard deviation of zero represents average performance.

LIMITATIONS OF THE MODEL

1) Double-base propellants with lead-based ballistic modifiers may require care in modeling. This ballistic model works by linearly interpolating a given thrust-versus-time curve. This approach works very well with rocket motors that use composite based propellants (HTPB, CTPB, etc.). However, rocket motors that use double-base propellants with lead-based ballistic modifiers would require a narrow range of temperature for this linear interpolation approach to work well. The reason for this is that this kind of double-base propellants has a negative slope on the action rate which typically causes the ballistic performance to remain pretty much the same above ambient (70° F.) temperature. These motors do not follow the linear interpolation between hot and cold temperature. For that reason, it is recommended with rocket propulsion systems with double-base propellant with lead-based ballistic modifiers to have two of these models instead of one. One model should cover the range above ambient temperature and one should cover the range below ambient temperature. However, if the user already knows what total impulse and action time is sought, then this point is irrelevant, i.e., the model will work well with double-base-propellant motors if these parameters are known.

2) The spreadsheet presented here was set for a baseline static firing data of 250 rows or less. Most of the ballistic data comes in the range of thousands of rows. For this reason, a program can be used which eliminates every other row of data every time it is run. This has been shown to result in extremely similar total impulse and action times (no loss of performance as a result of this kind of data reduction). Using a minimum amount of data also makes the model run much faster (provides answers in milliseconds).

ADVANTAGES OF THE MODEL

1) This model is geared for systems analyses (flight simulations). It is based on total impulse and action time performance at any temperature. It should always give users what they are looking for in terms of total impulse and action time.

2) No more calls to the propulsion design agent requesting more ballistic data. The model can generate any ballistic performance at any temperature . . . instantly.

3) It is easy to use, easy to set up and easy to update.

4) This model generates ballistic performance from empirical data, just like the very complex ballistic models available today. The small difference in shape of the curve seen in rocket motor firings (from one motor to the next within the same design) can not be faithfully predicted with the expensive complex ballistic models available today anyway. What ballisticians do today, is take the average shape of the curve and use that to make the next prediction. If the sample run used to set up this model is the same average shape of the curve used by ballisticians (historical average), then this model will be as accurate as the more complex ballistic models at a considerably lower effort. Everyone has to resolve according to predictions based on empirical data if they want a faithful prediction. This model takes the short route. Instead of empirically predicting erosion rate, web action back, action rate, specific impulse, etc., and adding up that together to come up with a prediction of the shape of the ballistic curve, this model avoids the lower tier parameters and predicts the shape of the curve from empirical data on the shape of the curve itself.

5) It provides answers instantly using any IBM compatible PC. Computer time is reduced at least 3 orders of magnitude relative to standard ballistic models.

RESULTS AND DISCUSSION

The standard used to evaluate this computer model or approach to ballistic prediction is the relationship between actual ballistic curves and the curves generated by this model. This is seen in the fourth page of the spreadsheet called VALIDATION. The better the correlation between these two curves, the better the model. Predictions have been done using data from four different rocket motors. The first one was done on a rocket motor that uses double-base propellant. The other three were done on motors that use composite propellants as the fuel. Data is presented here from two of them only (one double base and one composite propellant rocket motor). The other two are not needed for an understanding of the invention. Here the difference between them is evident.

Figure 3:
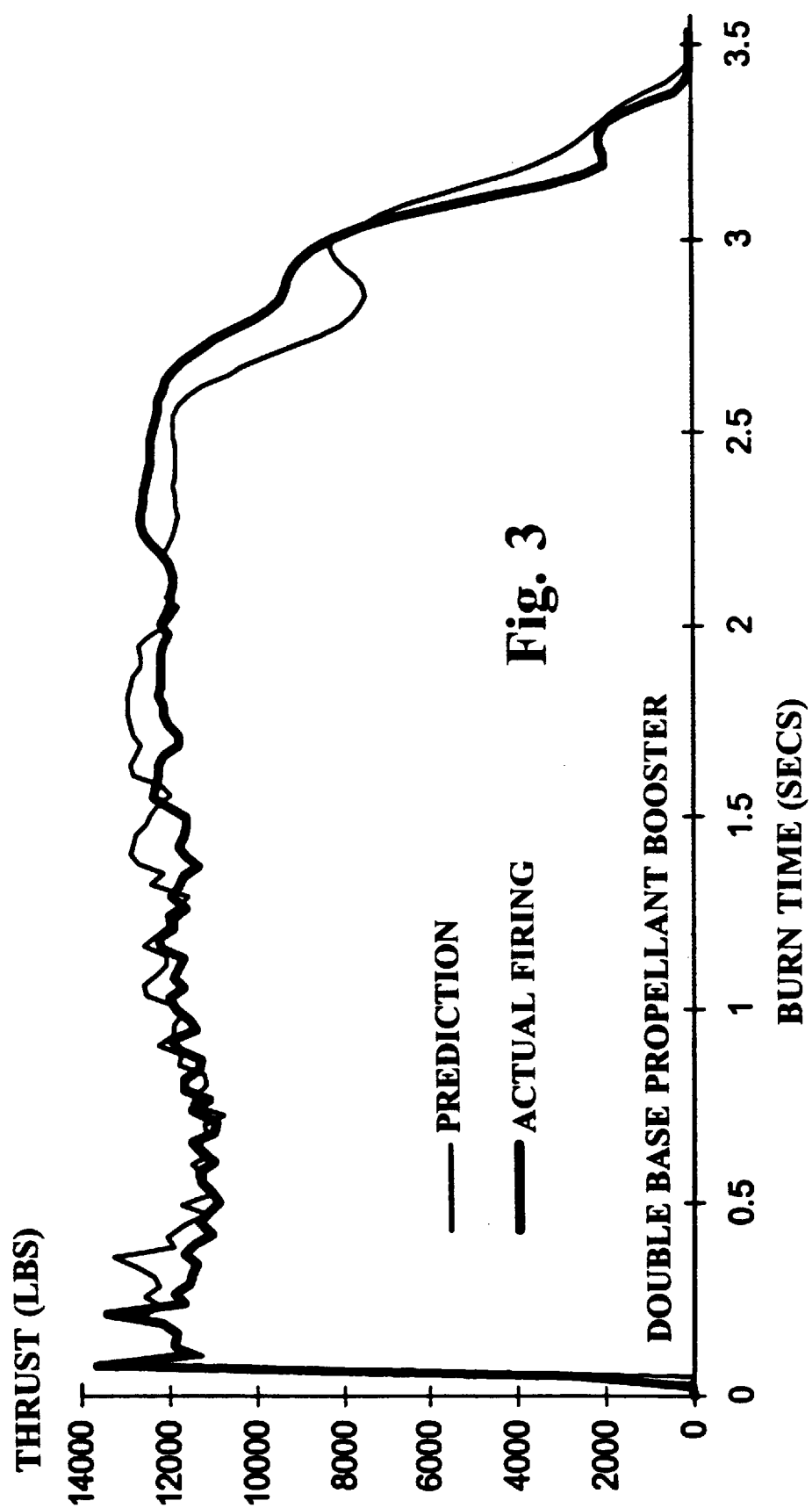
FIG. 3 is a thrust-versus-time curve illustrating irregularities arising in plots for double-base propellant rockets.

DOUBLE-BASE-PROPELLANT MOTOR: One inherent characteristic of double-base propellants is the tendency for combustion instability. This is seen as irregular (moving up and down) behavior or performance fluctuations recorded in the ballistic curves like pressure versus time or thrust versus time. When these irregularities are seen in both the pressure curve and the thrust curve, they are real. Sometimes, thrust can show up "ringing" which is due to facility equipment and not rocket motor performance. For this reason, it is important to verify that rocket-motor performance is seen in both the pressure and thrust curves. These irregular burnings seen in double-base propellants can not be predicted accurately even with the complicated ballistic models. The performance of a double-base-propellant rocket motor (Booster A) as shown in FIG. 3 demonstrates the point. One curve represents an actual firing and the other one represents the prediction of that performance using this model.

As you can see above, the model does provide accurate thrust-versus-time data for flight simulations. If the user wants to simulate a flight using a motor with this kind of total impulse and this kind of action time, all that needs to be done is to input that information into the model and the desired thrust-versus-time curve will be generated instantly. The two curves in FIG. 3 have the same area under the curve (same total impulse) and end up at the same point in time. This "ending" is usually defined by the specification. It usually is some low percentage of the average value, for example, 10 percent of the average pressure or 10 percent of the average thrust. In the case above, it was defined as the point where thrust measured below 30 pounds.

Figure 4:
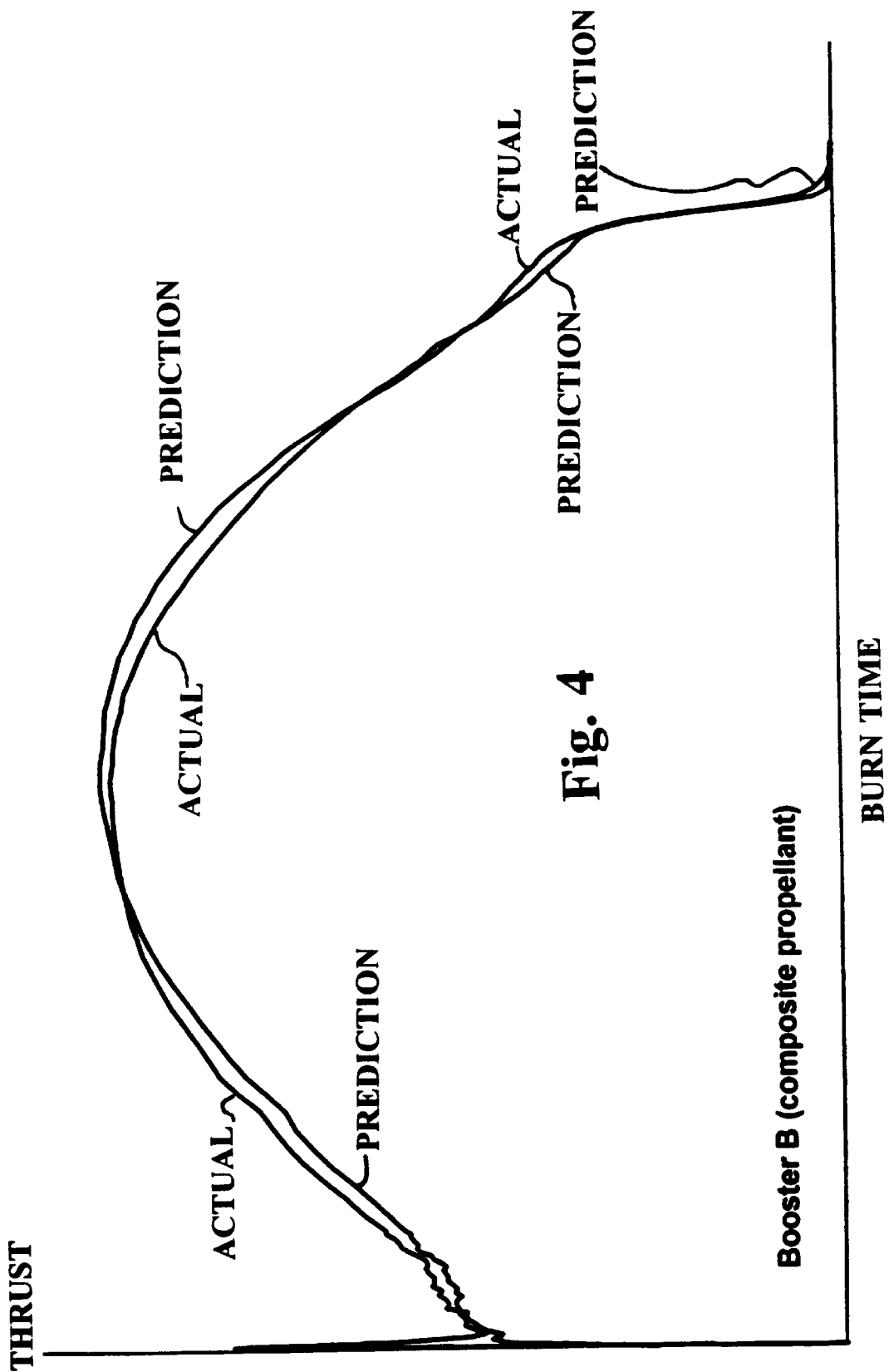
FIG. 4 is a thrust-versus-time curve for a predicted and actual firing, as derived in the VALIDATE sheet of the preferred embodiment spreadsheet.

The chart in FIG. 4 shows the model predicting a composite propellant rocket motor. That particular motor showed considerable changes in the shape of the curve as a function of temperature. Again, both traces (prediction and actual) have the same area under the curve and both end at the same time. Of the four motor designs that this model was tried on, this one shows the worst correlation. This motor in particular has a shape of the curve that does change with temperature. Here the shape of a curve obtained from a static firing at the cold temperature was used. With that curve (cold firing data), the performance of the motor at the hot temperature was predicted, and there is a difference in shape of the curve. This is about the worst composite propellant prediction to be expected using this model. The difference in ballistics is due to the variation in shape of the curve. The ballistic curve for this motor has the greatest change in shape (as a function of temperature) seen with composite propellants in the course of this work. This variation is difficult to predict and for that reason, ballisticians use the statistical average shape of the curve as the baseline for their models. Using the statistical average for the shape of the curve as the baseline performance will make this model as accurate as the more complicated ballistic models.

For this last motor in particular, it would be best to define or characterize the shape of the curve as a function of temperature to make more accurate predictions. The spike at ignition in FIG. 4 is due to "ringing" of the test stand. That spike was filtered out of the actual firing data.

Figure 5:
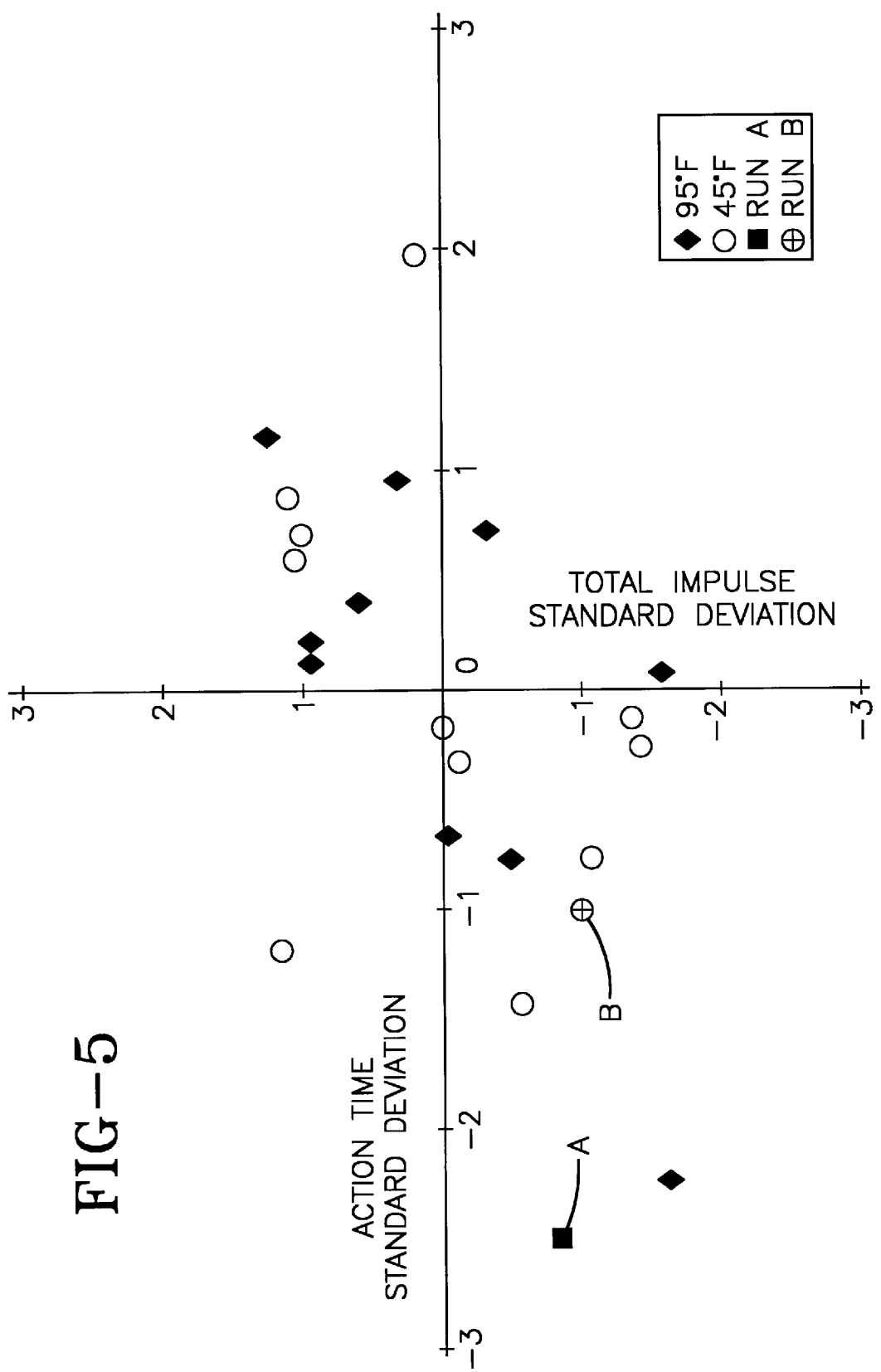
FIG. 5 is a plot showing deviations from the norm for total action time and total impulse for one type of rocket.

FIG. 5 is a plot showing deviations from the norm for total action time and total impulse for one type of rocket.

This spreadsheet provides flight simulation personnel with a tool to instantly generate their own ballistic performance without having to call the rocket motor manufacturer or design agent. This model is easy to set up, easy to use, and easy to update. It also provides accurate data at a fraction of the cost of a custom made ballistic model.

The issue of rocket motor weight as a function of burn time has to be included in the equations for flight simulation. This loss of mass during flight due to propellant burning was not presented here. However, this approach is also useful in determining rocket motor mass as a function of time. This can be done by calculating the cumulated total impulse (area under the curve from ignition up to the time of burning being analyzed) and dividing that number by the average specific impulse at that particular temperature and action time. This will be the next step in upgrading this model, i.e., to provide the user (flight simulation analyst) with rocket motor mass as a function of time for each one of these predictions. This too, will be verified by comparing the model predictions with the ones generated by the more complicated ballistic models.

The following pages provide detailed spreadsheet equations for general use and data for a specific rocket motor for which this system has been adapted.

In "Model" Spreadsheet
In column A, for rows 6–119—A(Row)='set-it-up'!A(Row+20)
In column B, for rows 6–119—B(Row)='set-it-up'!A(Row+20)
In column C
C2='set-it-up'!A23
C3='set-it-up'!A22
C6=0
For rows 7–119
C(Row)=C(Row-1)(B(Row)+B(Row-1))/2*(A(Row)-A(Row-1))
In column D, for rows 6–119—D(Row)=A(Row)*S$33/W$26
In column E, for rows 6–119—E(Row)=B(Row)*W$26/V$26*R$33/S$33

In column F, for rows 6–119—F(Row)=A(Row)*W$33/W$26
In column G, for rows 6–119—G(Row)=B(Row)*W$26/V$26*V$33/W$33
In column H, for rows 6–119—H(Row)=A(Row)*S$36/W$26
In column I, for rows 6–119—I(Row)=B(Row)*W$26*R$36/S$36
In column J, for rows 6–119—J(Row)=A(Row)*S$37/W$26
In column K, for rows 6–119—K(Row)=B(Row)*W$26/V$26*R$37
In column M, for rows 6–119—M(Row)=A(Row)*W$25/W$26
In column N, for rows 6–119—N(Row)=B(Row)*W$26/U$26*V$26/W$25
In column O
O6=0
For rows 7–119—O(Row)=(N(Row)+N(Row-1))/2*(M(Row)−M(Row-1))
In column P—For rows 21–25, P(Row)=Row
P99=0
In column Q
Q23='set-it-up'!A5
Q24='set-it-up'!A6
Q25='run-prgm'!Q20
Q31='set-it-up'!A5
Q32='set-it-up'!A6
Q32=Q25
Q99=0
In column R
R23='set-it-up'!A17
R24='set-it-up'!A18
R25=R24+($Q25−$Q24)*(R23−R24)/($Q23−$Q24)
R31=V23+3*R23
R32=V24+3*R24
R33=R32+($Q33−$Q32)*(R31−R32)/($Q31−$Q32)
R36=V25+S19*R25
R37=V25+X19*R25
R99=0
In column S
S18='Run-Prgm'!Q23
S19='Run-Prgm'!Q22
S23='set-it-up'!A14
S24='set-it-up'!A15
S25=S24+($Q25−$Q24)*(S23−S24)/($Q23−$Q24)
S31=W23−3*S23
S32=W24−3*S24
S33=S32+($Q33−$Q32)*(S31−S32)/($Q31−$Q32)
S36=W25−S18*S25
S37=W25−X18*S25
S99=0
In column V
V23='set-it-up'!A8
V24='set-it-up'!A9
V25=V24+($Q25−$Q24)*(V23−V24)/($Q23−$Q24)
V26='set-it-up'!A22
V31=V23−3*R23
V32=V24−3*R24
V33=V32+($Q33−$Q32)*(V31−V32)/($Q31−$Q32)
In column W
W23='set-it-up'!A11
W24='set-it-up'!A12
W25=W24+($Q25−$Q24)*(W23−W24)/($Q23−$Q24)
W26='set-it-up'!A23
W31=W23−3*S23
W32=W24−3*S24
W33=W32+($Q33−$Q32)*(W31−W32)/($Q31−$Q32)
In column Z—Lines 4–13 and 27–37, Z(Row)=AM(Row)
Z51=S18
Z52=X18
In column AA, rows 4–13—AA(Row)=AM(Row)
In column AB, rows 27–37—AB(Row)=AO(Row)
In column AC, AC51=S19
In column AD, AD52=X19
In column AH
AH1=AVERAGE(A127:A148)
AH2=STDEV(A127:A148)
In column AI
AI1=AVERAGE(AI4:AI13)
AI2=STDEV(AI4:AI13)
For Rows 4–13 and 27–37
AI(Row) is at value given on spread sheet
In column AJ
AJ1=AVERAGE(AJ4:AJ13)
AJ2=STDEV(AJ4:AJ13)
For Rows 4–13
AJ(Row) is at value given on spread sheet
In column AK
AK1=AVERAGE(AK27:AK37)
AK2=STDEV(AK27:AK37)
For Rows 27–37
AK(Row) is at value given on spread sheet
In column AM
For Rows 4–9—AM(Row)=(AI$1−AI(Row+10))/AI$2
For Rows 10–13 and 27–37—AM(Row)=(AI$1−AI(Row)))/AI$2
In column AN
For Rows 4–13—AN(Row)=(AJ(Row)−AJ$1)/AJ$2
In column AO
For Rows 27–37—AO(Row)=(AK(Row)−AK$1)/AK$2
In "Set-it-up" Spreadsheet
    In columns A and B, all values are entered directly in the cells where they appear and rather than being not calculated from combinations of other cells.
In column C—C26=0
For rows 27–139
C(Row)=(B(Row)+B(Row-1))/2*(A(Row)−A(Row-1))+C(Row-1)
In "Validate" spreadsheet
In column A
For rows 3–230
A(Row) is at value given on spread sheet
For rows 232–345—A(Row)=Model!H(Row-226)
For rows 347–460—A(Row)=Model!J(Row-341)
In column B
B1 is at the value given on spread sheet
For rows 232–345—B(Row)=Model!K(Row-341)
In column C
C1 is at the value given on spread sheet
For rows 347–460—C(Row)=Model!K(Row-341)
In column D
D1 is at the value given on the spread sheet
For rows 3–112
D(Row) is at the value given on the spread sheet
In column E
E1 is at the value given on the spread sheet
For rows 114–230
E(Row) is at the value given on the spread sheet
In column F
F3=0
For rows 4–112
F(Row)=F(Row-1)+(D(Row)+D(Row-1))/2*(A(Row)−A(Row-1))

In "Run-Prgm" Spreadsheet
In column A
For rows 3–116—A(Row)=Model!D(Row+3)
For rows 205–318—A(Row)=Model!F(Row-199)
For rows 405–518—A(Row)=Model!M(Row-399)
For rows 605–718—A(Row)=Model!H(Row-599)
For rows 805–918—A(Row)=Model!J(Row-799)
In column B
For rows 3–116—B(Row)=Model!E(Row+3)
In column C
For rows 205–318—C(Row)=Model!G(Row-199)
In column D
For rows 405–518—D(Row)=Model!N(Row-399)
In column E
For rows 605–718—E(Row)=Model!I(Row-599)
In column F
For rows 805–918—F(Row)=Model!K(Row-799)
K28 is at the value given on the spread sheet
L28 is at the value given on the spread sheet
M28 is at the value given on the spread sheet
N28 is at the value given on the spread sheet
In column P, rows 29–30—P(Row)=Model!R(Row+7)
In column Q
For rows 20, 22, 23, 25, 27
Q(Row) is at the value given on the spread sheet
For rows 29–30—Q(Row)=Model!Q(Row+7)
In column T
For rows 6–16—T(Row)=Model!Z(Row-3)
For rows 18–28—T(Row) Model!Z(Row+9)
For rows 6–16—T(Row)=Model!Z(Row+21)
In column U, rows 6–16—U(Row)=Model!AA(Row-3)
In column V
V6=Model!AB3
For rows 18–28—V(Row)=Model!AB(Row+9)
In column W
W6=Model!AC3
W30=Model!AC51
In column X
W6=Model!AD3
X31=Model!AD52

TABLES

TABLE SET-UP-1 (SHEET 1 OF 3)

| CELL NUMBER ↓ | CELL LETTER → | | |
|---|---|---|---|
| | A | B | C |
| 1 | THIS IS WHERE USER UPDATES THIS MODEL AFTER PRODUCTION | | |
| 2 | DATA SHOWS OLD VALUES FOR AVERAGE PERFORMANCE AND STANDARD | | |
| 3 | DEVIATION NO LONGER REPRESENT THE LATEST POPULATION. | | |
| 4 | INPUT DATA ONLY FOR NUMERICAL VALUES IN CELLS A5–A18 | | |
| 5 | 120 | UPPER LIMIT OF ROCKET MOTOR OPERATING TEMPERATURE | |
| 6 | 0 | LOWER LIMIT OF ROCKET MOTOR OPERATING TEMPERATURE | |
| 7 | | | |
| 8 | 85519 | AVERAGE TOTAL IMPULSE HOT | |
| 9 | 84400 | AVERAGE TOTAL IMPULSE COLD | |
| 10 | | | |
| 11 | 12.908 | AVERAGE ACTION TIME HOT | |
| 12 | 15.549 | AVERAGE ACTION TIME COLD | |
| 13 | | | |
| 14 | 0.358 | ONE SIGMA (STD DEVIATION) FOR ACTION TIME HOT | |
| 15 | 0.336 | ONE SIGMA (STD DEVIATION) FOR ACTION TIME COLD | |
| 16 | | | |
| 17 | 416 | ONE SIGMA (STD DEVIATION) FOR TOTAL IMPULSE HOT | |
| 18 | 422 | ONE SIGMA (STD DEVIATION) FOR TOTAL IMPULSE COLD | |
| 19 | | | |
| 20 | SAMPLE RUN DATA | | |
| 21 | WARNING!!!! THE SAMPLE RUN SHOULD NOT BE TOUCHED!!! | | |
| 22 | 85909 | TOTAL IMPULSE OF THE SAMPLE RUN | |
| 23 | 12.503 | TOTAL BURN TIME OF THE SAMPLE RUN | |
| 24 | | | |
| 25 | TIME | THRUST | TOT-IMP |
| 26 | 0 | 0 | 0 |
| 27 | 0.04 | 7500 | 150 |
| 28 | 0.08 | 5500 | 410 |
| 29 | 0.12 | 4600 | 612 |
| 30 | 0.16 | 4400 | 792 |
| 31 | 0.2 | 4538.499 | 971 |
| 32 | 0.24 | 4655.955 | 1155 |
| 33 | 0.28 | 4646.049 | 1341 |
| 34 | 0.32 | 4666.807 | 1527 |
| 35 | 0.36 | 4727.247 | 1715 |
| 36 | 0.4 | 4729.499 | 1904 |
| 37 | 0.44 | 4747.069 | 2094 |
| 38 | 0.48 | 4768.539 | 2284 |
| 39 | 0.52 | 4760.376 | 2474 |
| 40 | 0.56 | 4692.738 | 2663 |
| 41 | 0.6 | 4780.387 | 2853 |
| 42 | 0.64 | 4752.045 | 3044 |
| 43 | 0.68 | 4803.184 | 3235 |

TABLES -continued

| | | | |
|---|---|---|---|
| 44 | 0.72 | 4865.085 | 3428 |
| 45 | 0.76 | 4857.786 | 3622 |
| 46 | 0.8 | 4890.703 | 3817 |
| 47 | 0.84 | 4920.264 | 4014 |
| 48 | 0.88 | 4885.805 | 4210 |
| 49 | 0.92 | 4933.244 | 4406 |
| 50 | 0.96 | 5037.17 | 4606 |

TABLE SET-UP-1 (SHEET 2 OF 3)

| CELL NUMBER | CELL LETTER → | | |
|---|---|---|---|
| ↓ | A | B | C |
| 51 | 1 | 5070.259 | 4808 |
| 52 | 1.04 | 5199.047 | 5013 |
| 53 | 1.08 | 5242.759 | 5222 |
| 54 | 1.12 | 5227.761 | 5431 |
| 55 | 1.16 | 5274.576 | 5641 |
| 56 | 1.2 | 5314.36 | 5853 |
| 57 | 1.24 | 5313.518 | 6066 |
| 58 | 1.28 | 5390.699 | 6280 |
| 59 | 1.367 | 5497.855 | 6753 |
| 60 | 1.567 | 5727.614 | 7816 |
| 61 | 1.767 | 5979.752 | 9047 |
| 62 | 1.967 | 6267.648 | 10272 |
| 63 | 2.167 | 6499.139 | 11548 |
| 64 | 2.367 | 6698.448 | 12868 |
| 65 | 2.568 | 6825.54 | 14227 |
| 66 | 2.768 | 7062.261 | 15616 |
| 67 | 2.968 | 7309.276 | 17053 |
| 68 | 3.168 | 7509.684 | 18535 |
| 69 | 3.368 | 7671.633 | 20053 |
| 70 | 3.568 | 7850.81 | 21605 |
| 71 | 3.768 | 8004.048 | 23191 |
| 72 | 3.968 | 8168.321 | 24808 |
| 73 | 4.168 | 8328.032 | 26458 |
| 74 | 4.368 | 8453.639 | 28136 |
| 75 | 4.568 | 8566.096 | 29838 |
| 76 | 4.768 | 8662.921 | 31561 |
| 77 | 4.968 | 8756.393 | 33303 |
| 78 | 5.168 | 8834.004 | 35062 |
| 79 | 5.368 | 8879.58 | 36833 |
| 80 | 5.568 | 8927.439 | 38614 |
| 81 | 5.768 | 8977.417 | 40404 |
| 82 | 5.968 | 9020.127 | 42204 |
| 83 | 6.168 | 9046.366 | 44011 |
| 84 | 6.368 | 9036.705 | 45819 |
| 85 | 6.568 | 9002.125 | 47623 |
| 86 | 6.768 | 8979.575 | 49421 |
| 87 | 6.968 | 8966.719 | 51216 |
| 88 | 7.168 | 8905.368 | 53003 |
| 89 | 7.368 | 8843.376 | 54778 |
| 90 | 7.568 | 8778.622 | 56540 |
| 91 | 7.768 | 8657.706 | 58284 |
| 92 | 7.968 | 8575.958 | 60007 |
| 93 | 8.168 | 8425.731 | 61707 |
| 94 | 8.368 | 8308.249 | 63380 |
| 95 | 8.568 | 8143.929 | 65026 |

TABLE SET-UP-1 (SHEET 3 OF 3)

| CELL NUMBER | CELL LETTER → | | |
|---|---|---|---|
| ↓ | A | B | C |
| 96 | 8.768 | 7961.458 | 66636 |
| 97 | 8.968 | 7761.38 | 68209 |
| 98 | 9.168 | 7559.735 | 69741 |
| 99 | 9.368 | 7289.372 | 71226 |
| 100 | 9.567 | 7009.426 | 72648 |
| 101 | 9.767 | 6734.711 | 74023 |
| 102 | 9.967 | 6402.944 | 75336 |
| 103 | 10.167 | 6063.252 | 76583 |
| 104 | 10.367 | 5660.299 | 77755 |

-continued

TABLES

| | | | |
|---|---|---|---|
| 105 | 10.502 | 5390.56 | 78501 |
| 106 | 10.582 | 5254.625 | 78927 |
| 107 | 10.662 | 5133.912 | 79343 |
| 108 | 10.742 | 4995.943 | 79748 |
| 109 | 10.822 | 4857.713 | 80142 |
| 110 | 10.902 | 4739.82 | 80526 |
| 111 | 10.982 | 4631.317 | 80901 |
| 112 | 11.062 | 4535.427 | 81267 |
| 113 | 11.142 | 4385.106 | 81624 |
| 114 | 11.223 | 4210.825 | 81972 |
| 115 | 11.303 | 4091.566 | 82305 |
| 116 | 11.383 | 3965.745 | 82627 |
| 117 | 11.463 | 3833.621 | 82939 |
| 118 | 11.543 | 3720.597 | 83241 |
| 119 | 11.623 | 3631.211 | 83535 |
| 120 | 11.703 | 3541.954 | 83822 |
| 121 | 11.783 | 3422.191 | 84101 |
| 122 | 11.863 | 3328.5 | 84371 |
| 123 | 11.943 | 3211.672 | 84632 |
| 124 | 12.023 | 3143.43 | 84886 |
| 125 | 12.103 | 3048.814 | 85134 |
| 126 | 12.183 | 2860.802 | 85370 |
| 127 | 12.263 | 2451.35 | 85583 |
| 128 | 12.343 | 1718.583 | 85750 |
| 129 | 12.423 | 915.465 | 85855 |
| 130 | 12.503 | 429.239 | 85909 |
| 131 | 12.583 | 232.673 | 85935 |
| 132 | 12.663 | 137.326 | 85950 |
| 133 | 12.743 | 60.049 | 85958 |
| 134 | 12.823 | 22.529 | 85961 |
| 135 | 12.903 | 28.616 | 85963 |
| 136 | 12.983 | 15.906 | 85965 |
| 137 | 13.063 | 11.618 | 85966 |
| 138 | 13.073 | 11.787 | 85966 |
| 139 | 13.083 | 13.27 | 85967 |

TABLE RUN-PROGRAM-1 (SHEET 1 OF 1)

| CELL NUMBER | CELL LETTER → | | | | | |
|---|---|---|---|---|---|---|
| ↓ | B | C | D | E | F | G |
| 2 | +3 Sigma | −3 Sigma | Average | Run-A | Run-B | Spec Lim (70° F.) |

TABLE RUN-PROGRAM-2 (SHEET 1 OF 2)

| CELL NUMBER | CELL LETTER → | |
|---|---|---|
| ↓ | A | B |
| 3 | 0 | 0 |
| 4 | 0.044499 | 6742.77086 |
| 5 | 0.088999 | 4944.69863 |
| 6 | 0.133498 | 4135.56613 |
| 7 | 0.177997 | 3955.75891 |
| 8 | 0.222496 | 4080.27465 |
| 9 | 0.266996 | 4185.87163 |
| 10 | 0.311495 | 4176.96605 |
| 11 | 0.355994 | 4195.62817 |
| 12 | 0.400494 | 4249.96612 |
| 13 | 0.444993 | 4251.99041 |
| 14 | 0.489492 | 4267.78661 |
| 15 | 0.533992 | 4287.08905 |
| 16 | 0.578491 | 4279.74995 |
| 17 | 0.62299 | 4218.94094 |
| 18 | 0.667489 | 4297.74056 |
| 19 | 0.711989 | 4272.26008 |
| 20 | 0.756488 | 4318.23588 |
| 21 | 0.800987 | 4373.88712 |
| 22 | 0.845487 | 4367.32505 |
| 23 | 0.889986 | 4396.91863 |
| 24 | 0.934485 | 4423.49503 |
| 25 | 0.978984 | 4392.51515 |
| 26 | 1.023484 | 4435.16452 |
| 27 | 1.067983 | 4528.59775 |

-continued

TABLES

| | | |
|---|---|---|
| 28 | 1.112482 | 4558.34595 |
| 29 | 1.156982 | 4674.13102 |
| 30 | 1.201481 | 4713.42968 |
| 31 | 1.24598 | 4699.94594 |
| 32 | 1.29048 | 4742.03432 |
| 33 | 1.334979 | 4777.80157 |
| 34 | 1.379478 | 4777.04458 |
| 35 | 1.423977 | 4846.43309 |
| 36 | 1.520763 | 4942.7702 |
| 37 | 1.74326 | 5149.33184 |
| 38 | 1.965756 | 5376.01301 |
| 39 | 2.188253 | 5634.84191 |
| 40 | 2.410749 | 5842.96068 |
| 41 | 2.633246 | 6022.14667 |
| 42 | 2.856855 | 6136.40697 |
| 43 | 3.079351 | 6349.22769 |
| 44 | 3.301848 | 6571.3031 |
| 45 | 3.524344 | 6751.47713 |
| 46 | 3.746841 | 6897.07513 |
| 47 | 3.969337 | 7058.16172 |
| 48 | 4.191833 | 7195.92822 |
| 49 | 4.41433 | 7343.61558 |
| 50 | 4.636826 | 7487.20154 |
| 51 | 4.859323 | 7600.12677 |
| 52 | 5.081819 | 7701.22967 |
| 53 | 5.304316 | 7188.27884 |
| 54 | 5.526812 | 7872.31355 |
| 55 | 5.749309 | 7942.08864 |
| 56 | 5.971805 | 7983.06311 |
| 57 | 6.194302 | 8026.09008 |
| 58 | 6.416798 | 8071.02211 |
| 59 | 6.639295 | 8109.41994 |
| 60 | 6.861791 | 8133.00975 |
| 61 | 7.084288 | 8124.32416 |
| 62 | 7.306784 | 8093.23549 |
| 63 | 7.52928 | 8072.96223 |
| 64 | 7.751777 | 8061.40422 |
| 65 | 7.974273 | 8006.24745 |

TABLE RUN-PROGRAM-2 (SHEET 2 OF 2)

| CELL NUMBER | CELL LETTER → | |
|---|---|---|
| ↓ | A | B |
| 66 | 8.19677 | 7950.51441 |
| 67 | 8.419266 | 7892.29822 |
| 68 | 8.641763 | 7783.59037 |
| 69 | 8.864259 | 7710.09597 |
| 70 | 9.086756 | 7575.03647 |
| 71 | 9.309252 | 7469.41591 |
| 72 | 9.531749 | 7321.68629 |
| 73 | 9.754245 | 7157.63827 |
| 74 | 9.976742 | 6977.76092 |
| 75 | 10.19924 | 6796.47479 |
| 76 | 10.42173 | 6553.40869 |
| 77 | 10.64312 | 6301.72712 |
| 78 | 10.86561 | 6054.74842 |
| 79 | 11.08811 | 5756.4779 |
| 80 | 11.31061 | 5451.08252 |
| 81 | 11.5331 | 5088.81322 |
| 82 | 11.68329 | 4846.30812 |
| 83 | 11.77229 | 4724.09765 |
| 84 | 11.86129 | 4615.5723 |
| 85 | 11.95029 | 4491.53319 |
| 86 | 12.03928 | 4367.25942 |
| 87 | 12.12828 | 4261.26936 |
| 88 | 12.21728 | 4163.72124 |
| 89 | 12.30628 | 4077.51267 |
| 90 | 12.39528 | 3942.36866 |
| 91 | 12.48539 | 3785.68375 |
| 92 | 12.57439 | 3678.4656 |
| 93 | 12.66339 | 3565.34798 |
| 94 | 12.75239 | 3446.56373 |
| 95 | 12.84138 | 3344.95107 |
| 96 | 12.93038 | 3264.58983 |

-continued

TABLES

| | | |
|---|---|---|
| 97 | 13.01938 | 3184.34456 |
| 98 | 13.10838 | 3076.6733 |
| 99 | 13.19738 | 2992.44171 |
| 100 | 13.28638 | 2887.40912 |
| 101 | 13.37538 | 2826.0571 |
| 102 | 13.46437 | 2740.99389 |
| 103 | 13.55337 | 2571.96432 |
| 104 | 13.64237 | 2203.85218 |
| 105 | 13.73137 | 1545.06818 |
| 106 | 13.82037 | 823.036097 |
| 107 | 13.90937 | 385.901363 |
| 108 | 13.99837 | 209.18143 |
| 109 | 14.08736 | 123.461034 |
| 110 | 14.17636 | 53.9862197 |
| 111 | 14.26536 | 20.2543846 |
| 112 | 14.35436 | 25.7268175 |
| 113 | 14.44336 | 14.3000684 |
| 114 | 14.53236 | 10.4450016 |
| 115 | 14.54348 | 10.5969387 |
| 116 | 14.55461 | 11.9302093 |

TABLE RUN-PROGRAM-3 (SHEET 1 OF 2)

| CELL NUMBER | LETTER → | |
|---|---|---|
| ↓ | A | C |
| 205 | 0 | 0 |
| 206 | 0.051047 | 5705.197 |
| 207 | 0.102095 | 4183.811 |
| 208 | 0.153142 | 3499.188 |
| 209 | 0.20419 | 3347.049 |
| 210 | 0.255237 | 3452.404 |
| 211 | 0.306285 | 3541.752 |
| 212 | 0.357332 | 3534.217 |
| 213 | 0.40838 | 3550.007 |
| 214 | 0.459427 | 3595.984 |
| 215 | 0.510475 | 3597.697 |
| 216 | 0.561522 | 3611.062 |
| 217 | 0.61257 | 3627.394 |
| 218 | 0.663617 | 3621.185 |
| 219 | 0.714665 | 3569.733 |
| 220 | 0.765712 | 3636.407 |
| 221 | 0.81676 | 3614.847 |
| 222 | 0.867807 | 3653.748 |
| 223 | 0.918855 | 3700.836 |
| 224 | 0.969902 | 3695.284 |
| 225 | 1.02095 | 3720.323 |
| 226 | 1.071997 | 3742.81 |
| 227 | 1.123045 | 3716.598 |
| 228 | 1.174092 | 3752.684 |
| 229 | 1.22514 | 3831.74 |
| 230 | 1.276187 | 3856.91 |
| 231 | 1.327235 | 3954.879 |
| 232 | 1.378282 | 3988.13 |
| 233 | 1.429329 | 3976.721 |
| 234 | 1.480377 | 4012.333 |
| 235 | 1.531424 | 4042.596 |
| 236 | 1.582472 | 4041.956 |
| 237 | 1.633519 | 4100.667 |
| 238 | 1.744548 | 4182.18 |
| 239 | 1.999785 | 4356.956 |
| 240 | 2.255023 | 4548.755 |
| 241 | 2.51026 | 4767.756 |
| 242 | 2.765497 | 4943.849 |
| 243 | 3.020735 | 5095.462 |
| 244 | 3.277248 | 5192.14 |
| 245 | 3.532486 | 5372.212 |
| 246 | 3.787723 | 5560.115 |
| 247 | 4.042961 | 5712.564 |
| 248 | 4.298198 | 5835.757 |
| 249 | 4.553435 | 5972.056 |
| 250 | 4.808673 | 6088.623 |
| 251 | 5.06391 | 6213.584 |
| 252 | 5.319148 | 6335.075 |
| 253 | 5.574385 | 6430.624 |

-continued

TABLES

| | | |
|---|---|---|
| 254 | 5.829622 | 6516.169 |
| 255 | 6.08486 | 6589.823 |
| 256 | 6.340097 | 6660.927 |
| 257 | 6.595335 | 6719.965 |
| 258 | 6.850572 | 6754.634 |
| 259 | 7.105809 | 6791.04 |
| 260 | 7.361047 | 6829.058 |
| 261 | 7.616284 | 6861.547 |
| 262 | 7.871522 | 6881.507 |
| 263 | 8.126759 | 6874.158 |
| 264 | 8.381997 | 6847.853 |
| 265 | 8.637234 | 6830.7 |
| 266 | 8.892471 | 6820.92 |
| 267 | 9.147709 | 6774.251 |

TABLE RUN-PROGRAM-3 (SHEET 2 OF 2)

| CELL NUMBER ↓ | LETTER → | |
|---|---|---|
| | A | C |
| 268 | 9.402946 | 6727.094 |
| 269 | 9.658184 | 6677.836 |
| 270 | 9.913421 | 6585.856 |
| 271 | 10.16866 | 6523.671 |
| 272 | 10.4239 | 6409.394 |
| 273 | 10.67913 | 6320.027 |
| 274 | 10.93437 | 6195.03 |
| 275 | 11.18961 | 6056.225 |
| 276 | 11.44485 | 5904.027 |
| 277 | 11.70008 | 5750.637 |
| 278 | 11.95532 | 5544.974 |
| 279 | 12.20928 | 5332.021 |
| 280 | 12.46452 | 5123.047 |
| 281 | 12.71976 | 4870.675 |
| 282 | 12.97499 | 4612.273 |
| 283 | 13.23023 | 4305.75 |
| 284 | 13.40252 | 4100.561 |
| 285 | 13.50461 | 3997.156 |
| 296 | 13.60671 | 3905.331 |
| 287 | 13.7088 | 3800.379 |
| 288 | 13.8109 | 3695.228 |
| 289 | 13.91299 | 3605.548 |
| 290 | 14.01509 | 3523.01 |
| 291 | 14.11718 | 3450.067 |
| 292 | 14.21928 | 3335.719 |
| 293 | 14.32265 | 3203.145 |
| 294 | 14.42474 | 3112.426 |
| 295 | 14.52684 | 3016.714 |
| 296 | 14.62893 | 2916.209 |
| 297 | 14.73103 | 2830.232 |
| 298 | 14.83312 | 2762.237 |
| 299 | 14.93522 | 2694.34 |
| 300 | 15.03731 | 2603.237 |
| 301 | 15.13941 | 2531.967 |
| 302 | 15.2415 | 2443.096 |
| 303 | 15.3436 | 2391.185 |
| 304 | 15.44569 | 2319.211 |
| 305 | 15.54779 | 2176.192 |
| 306 | 15.64988 | 1864.725 |
| 307 | 15.75198 | 1307.314 |
| 308 | 15.85407 | 696.3878 |
| 309 | 15.95617 | 326.5191 |
| 310 | 16.05826 | 176.9927 |
| 311 | 16.16036 | 104.4629 |
| 312 | 16.26245 | 45.67885 |
| 313 | 16.36455 | 17.13765 |
| 314 | 16.46664 | 21.76799 |
| 315 | 16.56874 | 12.09958 |
| 316 | 16.67083 | 8.837731 |
| 317 | 16.68359 | 8.966288 |
| 318 | 16.69636 | 10.0944 |

-continued

TABLES

TABLE RUN-PROGRAM-4 (SHEET 1 OF 2)

| CELL NUMBER ↓ | LETTER → A | D |
|---|---|---|
| 405 | 0 | 0 |
| 406 | 0.047773 | 6188.43 |
| 407 | 0.095547 | 4538.182 |
| 408 | 0.14332 | 3795.57 |
| 409 | 0.191094 | 3630.545 |
| 410 | 0.238867 | 3744.824 |
| 411 | 0.28664 | 3841.74 |
| 412 | 0.334414 | 3833.567 |
| 413 | 0.382187 | 3850.694 |
| 414 | 0.42996 | 3900.565 |
| 415 | 0.477734 | 3902.423 |
| 416 | 0.525507 | 3916.92 |
| 417 | 0.573281 | 3934.636 |
| 418 | 0.621054 | 3927.9 |
| 419 | 0.668827 | 3872.091 |
| 420 | 0.716601 | 3944.412 |
| 421 | 0.764374 | 3921.026 |
| 422 | 0.812148 | 3963.222 |
| 423 | 0.859921 | 4014.298 |
| 424 | 0.907694 | 4008.276 |
| 425 | 0.955468 | 4035.436 |
| 426 | 1.003241 | 4059.828 |
| 427 | 1.051015 | 4031.395 |
| 428 | 1.098788 | 4070.538 |
| 429 | 1.146561 | 4156.29 |
| 430 | 1.194335 | 4183.592 |
| 431 | 1.242108 | 4289.858 |
| 432 | 1.289881 | 4325.926 |
| 433 | 1.337655 | 4313.551 |
| 434 | 1.385428 | 4352.179 |
| 435 | 1.433202 | 4385.006 |
| 436 | 1.480975 | 4384.311 |
| 437 | 1.528748 | 4447.995 |
| 438 | 1.632656 | 4536.412 |
| 439 | 1.871522 | 4725.992 |
| 440 | 2.110389 | 4934.037 |
| 441 | 2.349256 | 5171.587 |
| 432 | 2.588123 | 5362.595 |
| 443 | 2.82699 | 5527.05 |
| 444 | 3.067051 | 5631.917 |
| 445 | 3.305918 | 5827.241 |
| 446 | 3.544785 | 6031.059 |
| 447 | 3.783652 | 6196.42 |
| 448 | 4.022519 | 6330.048 |
| 449 | 4.261386 | 6477.891 |
| 450 | 4.500253 | 6604.332 |
| 451 | 4.73912 | 6739.877 |
| 452 | 4.977987 | 6871.659 |
| 453 | 5.216854 | 6975.3 |
| 454 | 5.455721 | 7068.091 |
| 455 | 5.694588 | 7147.984 |
| 456 | 5.933455 | 7225.11 |
| 457 | 6.172322 | 7289.148 |
| 458 | 6.411189 | 7326.754 |
| 459 | 6.650056 | 7366.244 |
| 460 | 6.888923 | 7407.482 |
| 461 | 7.127789 | 7442.723 |
| 462 | 7.366656 | 7464.373 |
| 463 | 7.605523 | 7456.402 |
| 464 | 7.84439 | 7427.869 |
| 465 | 8.083257 | 7409.262 |
| 466 | 8.322124 | 7398.655 |
| 467 | 8.560991 | 7348.032 |

-continued

TABLES

TABLE RUN-PROGRAM-4 (SHEET 2 OF 2)

| CELL NUMBER ↓ | LETTER → | |
|---|---|---|
| | A | D |
| 468 | 8.799858 | 7296.881 |
| 469 | 9.038725 | 7243.451 |
| 470 | 9.277592 | 7143.681 |
| 471 | 9.516459 | 7076.228 |
| 472 | 9.755326 | 6952.272 |
| 473 | 9.994193 | 6855.335 |
| 474 | 10.23306 | 6719.751 |
| 475 | 10.47193 | 6569.19 |
| 476 | 10.71079 | 6404.101 |
| 477 | 10.94966 | 6237.718 |
| 478 | 11.18853 | 6014.635 |
| 479 | 11.4262 | 5783.645 |
| 480 | 11.66507 | 5556.971 |
| 481 | 11.90393 | 5283.222 |
| 482 | 12.1428 | 5002.934 |
| 483 | 12.38167 | 4670.448 |
| 484 | 12.5429 | 4447.88 |
| 485 | 12.63845 | 4335.717 |
| 486 | 12.734 | 4236.114 |
| 487 | 12.82954 | 4122.272 |
| 488 | 12.92509 | 4008.215 |
| 489 | 13.02064 | 3910.939 |
| 490 | 13.11618 | 3821.411 |
| 491 | 13.21173 | 3742.289 |
| 492 | 13.30728 | 3618.256 |
| 493 | 13.40402 | 3474.453 |
| 494 | 13.49957 | 3376.049 |
| 495 | 13.59511 | 3272.231 |
| 496 | 13.69066 | 3163.213 |
| 497 | 13.78621 | 3069.954 |
| 498 | 13.88175 | 2996.199 |
| 499 | 13.9773 | 2922.551 |
| 500 | 14.07285 | 2823.732 |
| 501 | 14.16839 | 2746.425 |
| 502 | 14.26394 | 2650.028 |
| 503 | 14.35949 | 2593.719 |
| 504 | 14.45503 | 2515.649 |
| 505 | 14.55058 | 2360.516 |
| 506 | 14.64613 | 2022.668 |
| 507 | 14.74167 | 1418.044 |
| 508 | 14.83722 | 755.3721 |
| 509 | 14.93277 | 354.1754 |
| 510 | 15.02831 | 191.9841 |
| 511 | 15.12386 | 113.311 |
| 512 | 15.21941 | 49.54787 |
| 513 | 15.31495 | 18.58922 |
| 514 | 15.4105 | 23.61175 |
| 515 | 15.50605 | 13.12442 |
| 516 | 15.60159 | 9.58629 |
| 517 | 15.61354 | 9.725736 |
| 518 | 15.62548 | 10.94939 |

TABLE RUN-PROGRAM-5 (SHEET 1 OF 2)

| CELL NUMBER ↓ | LETTER → | |
|---|---|---|
| | A | E |
| 605 | 0 | 0 |
| 606 | 0.050502 | 5829.372 |
| 607 | 0.101004 | 4274.873 |
| 608 | 0.151505 | 3575.348 |
| 609 | 0.202007 | 3419.899 |
| 610 | 0.252509 | 3527.547 |
| 611 | 0.303011 | 3618.839 |
| 612 | 0.353513 | 3611.14 |
| 613 | 0.404014 | 3627.274 |
| 614 | 0.454516 | 3674.251 |
| 615 | 0.505018 | 3676.002 |

-continued

TABLES

| | | |
|---|---|---|
| 616 | 0.55552 | 3689.658 |
| 617 | 0.606022 | 3706.346 |
| 618 | 0.656523 | 3700.001 |
| 619 | 0.707025 | 3647.429 |
| 620 | 0.757527 | 3715.554 |
| 621 | 0.808029 | 3693.525 |
| 622 | 0.858531 | 3733.273 |
| 623 | 0.909032 | 3781.386 |
| 624 | 0.959534 | 3775.713 |
| 625 | 1.010036 | 3801.297 |
| 626 | 1.060538 | 3824.274 |
| 627 | 1.11104 | 3797.49 |
| 628 | 1.161541 | 3834.362 |
| 629 | 1.212043 | 3915.139 |
| 630 | 1.262545 | 3940.857 |
| 631 | 1.313047 | 4040.958 |
| 632 | 1.363549 | 4074.933 |
| 633 | 1.41405 | 4063.275 |
| 634 | 1.464552 | 4099.662 |
| 635 | 1.515054 | 4130.585 |
| 636 | 1.565556 | 4129.93 |
| 637 | 1.616058 | 4189.919 |
| 638 | 1.725899 | 4273.206 |
| 639 | 1.978408 | 4451.786 |
| 640 | 2.230917 | 4647.76 |
| 641 | 2.483426 | 4871.527 |
| 642 | 2.735935 | 5051.454 |
| 643 | 2.988444 | 5206.366 |
| 644 | 3.242216 | 5305.149 |
| 645 | 3.494725 | 5489.14 |
| 646 | 3.747234 | 5681.132 |
| 647 | 3.999743 | 5836.899 |
| 648 | 4.252252 | 5962.774 |
| 649 | 4.504761 | 6102.039 |
| 650 | 4.75727 | 6221.144 |
| 651 | 5.009779 | 6348.825 |
| 652 | 5.262288 | 6472.96 |
| 653 | 5.514797 | 6570.588 |
| 654 | 5.767306 | 6657.995 |
| 655 | 6.019815 | 6733.252 |
| 656 | 6.272324 | 6805.904 |
| 657 | 6.524833 | 6866.227 |
| 658 | 6.777342 | 6901.651 |
| 659 | 7.02985 | 6938.849 |
| 660 | 7.282359 | 6977.694 |
| 661 | 7.534868 | 7010.891 |
| 662 | 7.787377 | 7031.285 |
| 663 | 8.039886 | 7023.776 |
| 664 | 8.292395 | 6996.899 |
| 665 | 8.544904 | 6979.372 |
| 666 | 8.797413 | 6969.379 |
| 667 | 9.049922 | 6921.694 |

TABLE RUN-PROGRAM-5 (SHEET 2 OF 2)

| CELL NUMBER | LETTER → | |
|---|---|---|
| ↓ | A | E |
| 668 | 9.302431 | 6873.511 |
| 669 | 9.55494 | 6823.181 |
| 670 | 9.807449 | 6729.199 |
| 671 | 10.05996 | 6665.66 |
| 672 | 10.31247 | 6548.897 |
| 673 | 10.56498 | 6457.584 |
| 674 | 10.81749 | 6329.866 |
| 675 | 11.06999 | 6188.041 |
| 676 | 11.3225 | 6032.53 |
| 677 | 11.57501 | 5875.801 |
| 678 | 11.82752 | 5665.662 |
| 679 | 12.07877 | 5448.074 |
| 680 | 12.33128 | 5234.552 |
| 681 | 12.58379 | 4976.686 |
| 682 | 12.83629 | 4712.661 |
| 683 | 13.0888 | 4399.465 |
| 684 | 13.25925 | 4189.811 |

TABLES

-continued

| | | |
|---|---|---|
| 685 | 13.36025 | 4084.156 |
| 686 | 13.46125 | 3990.331 |
| 687 | 13.56226 | 3883.095 |
| 688 | 13.66326 | 3775.656 |
| 689 | 13.76427 | 3684.024 |
| 690 | 13.86527 | 3599.69 |
| 691 | 13.96627 | 3525.159 |
| 692 | 14.06728 | 3408.322 |
| 693 | 14.16954 | 3272.862 |
| 694 | 14.27055 | 3180.168 |
| 695 | 14.37155 | 3082.374 |
| 696 | 14.47255 | 2979.681 |
| 697 | 14.57356 | 2891.833 |
| 698 | 14.67456 | 2822.358 |
| 699 | 14.77556 | 2752.983 |
| 700 | 14.87657 | 2659.897 |
| 701 | 14.97757 | 2587.076 |
| 702 | 15.07857 | 2496.271 |
| 703 | 15.17958 | 2443.23 |
| 704 | 15.28058 | 2369.69 |
| 705 | 15.38159 | 2223.557 |
| 706 | 15.48259 | 1905.311 |
| 707 | 15.58359 | 1335.768 |
| 708 | 15.6846 | 711.5449 |
| 709 | 15.7856 | 333.6259 |
| 710 | 15.8866 | 180.845 |
| 711 | 15.98761 | 106.7366 |
| 712 | 16.08861 | 46.67307 |
| 713 | 16.18961 | 17.51066 |
| 714 | 16.29062 | 22.24178 |
| 715 | 16.39162 | 12.36293 |
| 716 | 16.49263 | 9.030087 |
| 717 | 16.50525 | 9.161442 |
| 718 | 16.51788 | 10.3141 |

TABLE RUN-PROGRAM-6 (SHEET 1 OF 2)

| CELL NUMBER | LETTER → | |
|---|---|---|
| ↓ | A | F |
| 805 | 0 | 0 |
| 806 | 0.048865 | 6020.157 |
| 807 | 0.09773 | 4414.782 |
| 808 | 0.146594 | 3692.363 |
| 809 | 0.195459 | 3531.825 |
| 810 | 0.244324 | 3642.997 |
| 811 | 0.293189 | 3737.277 |
| 812 | 0.342053 | 3729.326 |
| 813 | 0.390918 | 3745.988 |
| 814 | 0.439783 | 3794.503 |
| 815 | 0.488648 | 3796.31 |
| 816 | 0.537512 | 3810.414 |
| 817 | 0.586377 | 3827.647 |
| 818 | 0.635242 | 3821.095 |
| 819 | 0.684107 | 3766.803 |
| 820 | 0.732971 | 3837.157 |
| 821 | 0.781836 | 3814.408 |
| 822 | 0.830701 | 3855.456 |
| 823 | 0.879566 | 3905.143 |
| 824 | 0.92843 | 3899.285 |
| 825 | 0.977295 | 3925.707 |
| 826 | 1.02616 | 3949.435 |
| 827 | 1.075025 | 3921.775 |
| 828 | 1.123889 | 3959.854 |
| 829 | 1.172754 | 4043.274 |
| 830 | 1.221619 | 4069.834 |
| 831 | 1.270484 | 4173.211 |
| 832 | 1.319348 | 4208.298 |
| 833 | 1.368213 | 4196.259 |
| 834 | 1.417078 | 4233.837 |
| 835 | 1.465943 | 4265.771 |
| 836 | 1.514807 | 4265.095 |
| 837 | 1.563672 | 4327.047 |
| 838 | 1.669953 | 4413.06 |
| 839 | 1.914277 | 4597.485 |

-continued

TABLES

| | | |
|---|---|---|
| 840 | 2.1586 | 4799.873 |
| 841 | 2.402924 | 5030.963 |
| 842 | 2.647248 | 5216.778 |
| 843 | 2.891572 | 5376.761 |
| 844 | 3.137117 | 5478.776 |
| 845 | 3.381441 | 5668.789 |
| 846 | 3.625765 | 5867.065 |
| 847 | 3.870088 | 6027.93 |
| 848 | 4.114412 | 6157.925 |
| 849 | 4.358736 | 6301.748 |
| 850 | 4.60306 | 6424.75 |
| 851 | 4.847383 | 6556.61 |
| 852 | 5.091707 | 6684.808 |
| 853 | 5.336031 | 6785.631 |
| 854 | 5.580355 | 6875.899 |
| 855 | 5.824678 | 6953.619 |
| 856 | 6.069002 | 7028.648 |
| 857 | 6.313326 | 7090.946 |
| 858 | 6.55765 | 7127.529 |
| 859 | 6.801974 | 7165.945 |
| 860 | 7.046297 | 7206.061 |
| 861 | 7.290621 | 7240.344 |
| 862 | 7.534945 | 7261.406 |
| 863 | 7.779269 | 7253.651 |
| 864 | 8.023592 | 7225.894 |
| 865 | 8.267916 | 7207.794 |
| 866 | 8.51224 | 7197.474 |
| 867 | 8.756564 | 7148.229 |

TABLE RUN-PROGRAM-6 (SHEET 2 OF 2)

| CELL NUMBER ↓ | LETTER → | |
|---|---|---|
| | A | F |
| 868 | 9.000887 | 7098.468 |
| 869 | 9.245211 | 7046.491 |
| 870 | 9.489535 | 6949.433 |
| 871 | 9.733859 | 6883.815 |
| 872 | 9.978182 | 6763.23 |
| 873 | 10.22251 | 6668.929 |
| 874 | 10.46683 | 6537.031 |
| 875 | 10.71115 | 6390.564 |
| 876 | 10.95548 | 6229.964 |
| 877 | 11.1998 | 6068.106 |
| 878 | 11.44413 | 5851.089 |
| 879 | 11.68723 | 5626.379 |
| 880 | 11.93155 | 5405.869 |
| 881 | 12.17587 | 5139.564 |
| 882 | 12.4202 | 4866.897 |
| 883 | 12.66452 | 4543.452 |
| 884 | 12.82944 | 4326.936 |
| 885 | 12.92717 | 4217.822 |
| 886 | 13.0249 | 4120.928 |
| 887 | 13.12263 | 4010.182 |
| 888 | 13.22036 | 3899.226 |
| 889 | 13.31809 | 3804.595 |
| 890 | 13.41582 | 3717.501 |
| 891 | 13.51355 | 3640.531 |
| 892 | 13.61128 | 3519.87 |
| 893 | 13.71023 | 3379.977 |
| 894 | 13.80796 | 3284.249 |
| 895 | 13.90569 | 3183.254 |
| 896 | 14.00342 | 3077.2 |
| 897 | 14.10115 | 2986.477 |
| 898 | 14.19888 | 2914.728 |
| 899 | 14.2966 | 2843.083 |
| 900 | 14.39433 | 2746.95 |
| 901 | 14.49206 | 2671.746 |
| 902 | 14.58979 | 2577.969 |
| 903 | 14.68752 | 2523.192 |
| 904 | 14.78525 | 2447.245 |
| 905 | 14.88298 | 2296.33 |
| 906 | 14.98071 | 1967.668 |
| 907 | 15.07844 | 1379.485 |
| 908 | 15.17617 | 734.8324 |

-continued

TABLES

| | | |
|---|---|---|
| 909 | 15.2739 | 344.5448 |
| 910 | 15.37163 | 186.7637 |
| 911 | 15.46936 | 110.2299 |
| 912 | 15.56709 | 48.20059 |
| 913 | 15.66482 | 18.08375 |
| 914 | 15.76255 | 22.96971 |
| 915 | 15.86028 | 12.76755 |
| 916 | 15.95801 | 9.325625 |
| 917 | 15.97022 | 9.461279 |
| 918 | 15.98244 | 10.65166 |

TABLE RUN-PROGRAM-7 (SHEET 1 OF 1)

| CELL NUMBER ↓ | CELL LETTER → | | | | |
|---|---|---|---|---|---|
| | T | U | V | W | X |
| 5 | STDEV STANDARD DEVIATION FOR TOTAL IMPULSE | | | | |
| 6 | ACT. TM. | 95F | 45F | RUN A | RUN B |
| 7 | −0.773252 | −0.462634921 | | | |
| 8 | 0.1668647 | 0.923153698 | | | |
| 9 | −2.230313 | −1.585335317 | | | |
| 10 | 0.0658803 | −1.591626557 | | | |
| 11 | 0.9386742 | 0.335780643 | | | |
| 12 | 0.7126614 | −0.31278902 | | | |
| 13 | −0.662650 | −0.034830593 | | | |
| 14 | 0.3976862 | 0.591433764 | | | |
| 15 | 1.1670913 | 1.214266536 | | | |
| 16 | 0.2173569 | 0.922581767 | | | |
| 17 | | | | | |
| 18 | −1.19 | 1.14 | | | |
| 19 | −1.43 | −0.54 | | | |
| 20 | −0.12 | −1.34 | | | |
| 21 | 0.72 | 1.01 | | | |
| 22 | −0.26 | −1.41 | | | |
| 23 | 0.64 | 1.03 | | | |
| 24 | −0.32 | −0.10 | | | |
| 25 | −0.75 | −1.09 | | | |
| 26 | 2.01 | 0.19 | | | |
| 27 | −0.17 | −0.03 | | | |
| 28 | 0.88 | 1.13 | | | |
| 29 | | | | | |
| 30 | −2.5 | −0.85 | | | |
| 31 | −1 | −1 | | | |

TABLE RUN-PROGRAM-8 (SHEET 1 OF 1)

| CELL NUMBER ↓ | CELL LETTER → | | | | | | |
|---|---|---|---|---|---|---|---|
| | K | L | M | N | O | P | Q |
| 18 | SEE RESULTS OUTSIDE THIS STATEMENT | | | | INPUT | | |
| 19 | INPUT DATA ONLY IN CELLS Q20–Q26 | | | | HERE | | |
| 20 | MOTOR CONDITIONING TEMP FOR RUN A AND B — 28 | | | | | | |
| 21 | | | | | | | |
| 22 | RUN A   ASSIGN TOTAL IMPULSE DEV FOR RUN A (AVG = 0) | | | | | | −0.85 |
| 23 | ASSIGN ACTION TIME DEV FOR RUN A (AVG = 0) | | | | | | −2.5 |
| 24 | | | | | | | |
| 25 | RUN B   ASSIGN TOTAL IMPULSE DEV FOR RUN A (AVG = | | | | | | −1 |
| 26 | ASSIGN ACTION TIME DEV FOR RUN A (AVG = 0) | | | | | | −1 |
| 27 | | | | | | | |
| 28 | 15.879 | 84302.6 | 16.306 | 84116.8 | TOT IMP | ACT TIME | |
| 29 | | | | RUN A | 84,303.5 | 15.786 | |
| 30 | | | | RUN B | 84,240.5 | 15.274 | |

-continued

TABLES

TABLE MODEL-1 (SHEET 1 OF 2)

| CELL NUMBER ↓ | CELL LETTER → | | | | | | |
|---|---|---|---|---|---|---|---|
| | A | B | C | D | E | R | G |
| 1 | SAMPLE RUN | | | | | | |
| 2 | TOTAL BURN TIME | 12.503 | | | | | |
| 3 | TOTAL IMPULSE | 85909 | | | | | |
| 4 | TEMPERATURE | | 95 | +3 SGM @ 70° F. | | −3 SGM @ 70° F. | |
| 5 | time | thrust | Tot-Imp | TIME | THRUST | TIME | THRUST |
| 6 | 0.00 | 0 | 0 | 0.000 | 0.0 | 0.000 | 0 |
| 7 | 0.04 | 7500 | 150 | 0.044 | 6742.8 | 0.051 | 5,705.2 |
| 8 | 0.08 | 5500 | 410 | 0.089 | 4944.7 | 0.102 | 4,183.8 |
| 9 | 0.12 | 4600 | 612 | 0.133 | 4135.6 | 0.153 | 3,499.2 |
| 10 | 0.16 | 4400 | 792 | 0.178 | 3955.8 | 0.204 | 3,347.0 |
| 11 | 0.20 | 4538.49915 | 971 | 0.222 | 4080.3 | 0.255 | 3,452.4 |
| 12 | 0.24 | 4655.95492 | 1155 | 0.267 | 4185.9 | 0.306 | 3,541.8 |
| 13 | 0.28 | 4646.04923 | 1341 | 0.311 | 4177.0 | 0.357 | 3,534.2 |
| 14 | 0.32 | 4666.80715 | 1527 | 0.356 | 4195.6 | 0.408 | 3,550.0 |
| 15 | 0.36 | 4727.24738 | 1715 | 0.400 | 4250.0 | 0.459 | 3,596.0 |
| 16 | 0.40 | 4729.499 | 1904 | 0.445 | 4252.0 | 0.510 | 3,597.7 |
| 17 | 0.44 | 4747.06915 | 2094 | 0.489 | 4267.8 | 0.562 | 3,611.1 |
| 18 | 0.48 | 4768.53931 | 2284 | 0.534 | 4287.1 | 0.613 | 3,627.39 |
| 19 | 0.52 | 4760.376 | 2474 | 0.578 | 4279.7 | 0.664 | 3,621.18 |
| 20 | 0.56 | 4692.738 | 2663 | 0.623 | 4218.9 | 0.715 | 3,569.73 |
| 21 | 0.60 | 4780.387 | 2853 | 0.667 | 4297.7 | 0.766 | 3,636.41 |
| 22 | 0.64 | 4752.045 | 3044 | 0.712 | 4272.3 | 0.817 | 3,614.85 |
| 23 | 0.68 | 4803.184 | 3235 | 0.756 | 4318.2 | 0.868 | 3,653.75 |
| 24 | 0.72 | 4865.085 | 3428 | 0.801 | 4373.9 | 0.919 | 3,700.84 |
| 25 | 0.76 | 4857.786 | 3622 | 0.845 | 4367.3 | 0.970 | 3,695.28 |
| 26 | 0.80 | 4890.703 | 3817 | 0.890 | 4396.9 | 1.021 | 3,720.32 |
| 27 | 0.84 | 4920.264 | 4014 | 0.934 | 4423.5 | 1.072 | 3,742.81 |
| 28 | 0.88 | 4885.805 | 4210 | 0.979 | 4392.5 | 1.123 | 3,716.60 |
| 29 | 0.92 | 4933.244 | 4406 | 1.023 | 4435.2 | 1.174 | 3,752.68 |
| 30 | 0.96 | 5037.17 | 4606 | 1.068 | 4528.6 | 1.225 | 3,831.74 |
| 31 | 1.00 | 5070.259 | 4808 | 1.112 | 4558.3 | 1.276 | 3,856.91 |
| 32 | 1.04 | 5199.047 | 5013 | 1.157 | 4674.1 | 1.327 | 3,954.88 |
| 33 | 1.08 | 5242.759 | 5222 | 1.201 | 4713.4 | 1.378 | 3,988.13 |
| 34 | 1.12 | 5227.761 | 5431 | 1.246 | 4699.9 | 1.429 | 3,976.72 |
| 35 | 1.16 | 5274.576 | 5641 | 1.290 | 4742.0 | 1.480 | 4,012.33 |
| 36 | 1.20 | 5314.36 | 5853 | 1.335 | 4777.8 | 1.531 | 4,042.60 |
| 37 | 1.24 | 5313.518 | 6066 | 1.379 | 4777.0 | 1.582 | 4,041.96 |
| 38 | 1.28 | 5390.699 | 6280 | 1.424 | 4846.4 | 1.634 | 4,100.67 |
| 39 | 1.37 | 5497.855 | 6753 | 1.521 | 4942.8 | 1.745 | 4,182.18 |
| 40 | 1.57 | 5727.614 | 7876 | 1.743 | 5149.3 | 2.000 | 4,356.96 |
| 41 | 1.77 | 5979.752 | 9047 | 1.966 | 5376.0 | 2.255 | 4,548.76 |
| 42 | 1.97 | 6267.648 | 10272 | 2.188 | 5634.8 | 2.510 | 4,767.76 |
| 43 | 2.17 | 6499.139 | 11548 | 2.411 | 5843.0 | 2.765 | 4,943.85 |
| 44 | 2.37 | 6698.448 | 12868 | 2.633 | 6022.1 | 3.021 | 5,095.46 |
| 45 | 2.57 | 6825.54 | 14227 | 2.857 | 6136.4 | 3.277 | 5,192.14 |
| 46 | 2.77 | 7062.261 | 15616 | 3.079 | 6349.2 | 3.532 | 5,372.21 |
| 47 | 2.97 | 7309.276 | 17053 | 3.302 | 6571.3 | 3.788 | 5,560.11 |
| 48 | 3.17 | 7509.684 | 18535 | 3.524 | 6751.5 | 4.043 | 5,712.56 |
| 49 | 3.37 | 7671.633 | 20053 | 3.747 | 6897.1 | 4.298 | 5,835.76 |
| 50 | 3.57 | 7850.81 | 21605 | 3.969 | 7058.2 | 4.553 | 5,972.06 |
| 51 | 3.77 | 8004.048 | 23191 | 4.192 | 7195.9 | 4.809 | 6,088.62 |
| 52 | 3.97 | 8168.321 | 24808 | 4.414 | 7343.6 | 5.064 | 6,213.58 |
| 53 | 4.17 | 8328.032 | 26458 | 4.637 | 7487.2 | 5.319 | 6,335.08 |
| 54 | 4.37 | 8453.639 | 28136 | 4.859 | 7600.1 | 5.574 | 6,430.62 |
| 55 | 4.57 | 8566.096 | 29838 | 5.082 | 7701.2 | 5.830 | 6,516.17 |
| 56 | 4.77 | 8662.921 | 31561 | 5.304 | 7788.3 | 6.085 | 6,589.82 |
| 57 | 4.97 | 8756.393 | 33303 | 5.527 | 7872.3 | 6.340 | 6,660.93 |
| 58 | 5.17 | 8834.004 | 35062 | 5.749 | 7942.1 | 6.595 | 6,719.96 |
| 59 | 5.37 | 8879.58 | 36833 | 5.972 | 7983.1 | 6.851 | 6,754.63 |

TABLE MODEL-1 (SHEET 2 OF 2)

| CELL NUMBER ↓ | CELL LETTER → | | | | | | |
|---|---|---|---|---|---|---|---|
| | A | B | C | D | E | R | G |
| 60 | 5.57 | 8927.439 | 38614 | 6.194 | 8026.1 | 7.106 | 6,791.04 |
| 61 | 5.77 | 8977.417 | 40404 | 6.417 | 8071.0 | 7.361 | 6,829.06 |

-continued

TABLES

| | | | | | | | |
|---|---|---|---|---|---|---|---|
| 62 | 5.97 | 9020.127 | 42204 | 6.639 | 8109.4 | 7.616 | 6,861.55 |
| 63 | 6.17 | 9046.366 | 44011 | 6.862 | 8133.0 | 1.872 | 6,881.51 |
| 64 | 6.37 | 9036.705 | 45819 | 7.084 | 8124.3 | 8.127 | 6,874.16 |
| 65 | 6.57 | 9002.125 | 47623 | 7.307 | 8093.2 | 8.382 | 6,847.85 |
| 66 | 6.77 | 8979.575 | 49421 | 7.529 | 8073.0 | 8.637 | 6,830.70 |
| 67 | 6.97 | 8966.719 | 51216 | 7.752 | 8061.4 | 8.892 | 6,820.92 |
| 68 | 7.17 | 8905.368 | 53003 | 7.974 | 8006.2 | 9.148 | 6,774.25 |
| 69 | 7.37 | 8843.376 | 54778 | 8.197 | 7950.5 | 9.403 | 6,727.09 |
| 70 | 7.57 | 8778.622 | 56540 | 8.419 | 7892.3 | 9.658 | 6,677.84 |
| 71 | 7.77 | 8657.706 | 58284 | 8.642 | 7783.6 | 9.913 | 6,585.86 |
| 72 | 7.97 | 8575.958 | 60007 | 8.864 | 7710.1 | 10.169 | 6,523.67 |
| 73 | 8.17 | 8425.731 | 61707 | 9.087 | 7575.0 | 10.424 | 6,409.39 |
| 74 | 8.37 | 8308.249 | 63380 | 9.309 | 7469.4 | 10.679 | 6,320.03 |
| 75 | 8.57 | 8143.929 | 65026 | 9.532 | 7321.7 | 10.934 | 6,195.03 |
| 76 | 8.77 | 7961.458 | 66636 | 9.754 | 7157.6 | 11.190 | 6,056.23 |
| 77 | 8.97 | 7761.38 | 68209 | 9.977 | 6977.8 | 11.445 | 5,904.03 |
| 78 | 9.17 | 7559.735 | 69741 | 10.199 | 6796.5 | 11.700 | 5,750.64 |
| 79 | 9.37 | 7289.372 | 71226 | 10.422 | 6553.4 | 11.955 | 5,544.97 |
| 80 | 9.57 | 7009.426 | 72648 | 10.643 | 6301.7 | 12.209 | 5,332.02 |
| 81 | 9.77 | 6734.711 | 74023 | 10.866 | 6054.7 | 12.465 | 5,123.05 |
| 82 | 9.97 | 6402.944 | 75336 | 11.088 | 5756.5 | 12.720 | 4,870.67 |
| 83 | 10.17 | 6063.252 | 76583 | 11.311 | 5451.1 | 12.975 | 4,612.27 |
| 84 | 10.37 | 5660.299 | 77755 | 11.533 | 5088.8 | 13.230 | 4,305.75 |
| 85 | 10.50 | 5390.56 | 78501 | 11.683 | 4846.3 | 13.403 | 4,100.56 |
| 86 | 10.58 | 5254.625 | 78927 | 11.772 | 4724.1 | 13.505 | 3,997.16 |
| 87 | 10.66 | 5133.912 | 79343 | 11.861 | 4615.6 | 13.607 | 3,905.33 |
| 88 | 10.74 | 4995.943 | 79748 | 11.950 | 4491.5 | 13.709 | 3,800.38 |
| 89 | 10.82 | 4857.713 | 80142 | 12.039 | 4367.3 | 13.811 | 3,695.23 |
| 90 | 10.90 | 4739.82 | 80526 | 12.128 | 4261.3 | 13.913 | 3,605.55 |
| 91 | 10.98 | 4631.317 | 80901 | 12.217 | 4163.7 | 14.015 | 3,523.01 |
| 92 | 11.06 | 4535.427 | 81267 | 12.306 | 4077.5 | 14.117 | 3,450.07 |
| 93 | 11.14 | 4385.106 | 81624 | 12.395 | 3942.4 | 14.219 | 3,335.72 |
| 94 | 11.22 | 4210.825 | 81972 | 12.485 | 3785.7 | 14.323 | 3,203.15 |
| 95 | 11.30 | 4091.566 | 82305 | 12.574 | 3678.5 | 14.425 | 3,112.43 |
| 96 | 11.38 | 3965.745 | 82627 | 12.663 | 3565.3 | 14.527 | 3,016.71 |
| 97 | 11.46 | 3833.621 | 82939 | 12.752 | 3446.6 | 14.629 | 2,916.21 |
| 98 | 11.54 | 3720.597 | 83241 | 12.841 | 3345.0 | 14.731 | 2,830.23 |
| 99 | 11.62 | 3631.211 | 83535 | 12.930 | 3264.6 | 14.833 | 2,762.24 |
| 100 | 11.70 | 3541.954 | 83822 | 13.019 | 3184.3 | 14.935 | 2,694.34 |
| 101 | 11.78 | 3422.191 | 84101 | 13.108 | 3076.7 | 15.037 | 2,603.24 |
| 102 | 11.86 | 3328.5 | 84371 | 13.197 | 2992.4 | 15.139 | 2,531.97 |
| 103 | 11.94 | 3211.672 | 84632 | 13.286 | 2887.4 | 15.242 | 2,443.10 |
| 104 | 12.02 | 3143.43 | 84886 | 13.375 | 2826.1 | 15.344 | 2,391.19 |
| 105 | 12.10 | 3048.814 | 85134 | 13.464 | 2741.0 | 15.446 | 2,319.21 |
| 106 | 12.18 | 2860.802 | 85370 | 13.553 | 2572.0 | 15.548 | 2,176.19 |
| 107 | 12.26 | 2451.35 | 85583 | 13.642 | 2203.9 | 15.650 | 1,864.72 |
| 108 | 12.34 | 1718.583 | 85750 | 13.731 | 1545.1 | 15.752 | 1,307.31 |
| 109 | 12.42 | 915.465 | 85855 | 13.820 | 823.0 | 15.854 | 696.39 |
| 110 | 12.50 | 429.239 | 85909 | 13.909 | 385.9 | 15.956 | 326.52 |
| 111 | 12.58 | 232.673 | 85935 | 13.998 | 209.2 | 16.058 | 176.99 |
| 112 | 12.66 | 137.326 | 85950 | 14.087 | 123.5 | 16.160 | 104.46 |
| 113 | 12.74 | 60.049 | 85958 | 14.176 | 54.0 | 16.262 | 45.68 |
| 114 | 12.82 | 22.529 | 85961 | 14.265 | 20.3 | 16.365 | 17.14 |
| 115 | 12.90 | 28.616 | 85963 | 14.354 | 25.7 | 16.467 | 21.77 |
| 116 | 12.98 | 15.906 | 85965 | 14.443 | 14.3 | 16.569 | 12.10 |
| 117 | 13.06 | 11.618 | 85966 | 14.532 | 10.4 | 16.671 | 8.84 |
| 118 | 13.07 | 11.787 | 85966 | 14.543 | 10.6 | 16.684 | 8.97 |
| 119 | 13.08 | 13.27 | 85967 | 14.555 | 11.9 | 16.696 | 10.09 |

TABLE MODEL-2 (SHEET 1 OF 2)

| CELL NUMBER | CELL LETTER → | | | | | | |
|---|---|---|---|---|---|---|---|
| ↓ | H | I | J | K | M | N | O |
| 2 | THIS MODEL GENERATES THESE FOUR | | | | | | |
| 3 | COLUMNS FOR THE USER (DIGITAL DATA) | | | FIXED FOR 70 TOT IMPULSE | | | |
| 4 | RUN A | | RUN B | | AVG THRUST PERF. @ 70 F. | | |
| 5 | TIME | THRUST | TIME | THRUST | TIME | THRUST | TI/DT |
| 6 | 0.000 | 0 | 0.000 | 0 | 0.000 | 0.0 | 0.0 |
| 7 | 0.051 | 5,829.37 | 0.049 | 6,020.16 | 0.048 | 6188.4 | 147.8 |
| 8 | 0.101 | 4,274.87 | 0.098 | 4,414.78 | 0.096 | 4538.2 | 256.2 |
| 9 | 0.152 | 3,575.35 | 0.147 | 3,692.36 | 0.143 | 3795.6 | 199.1 |
| 10 | 0.202 | 3,419.90 | 0.195 | 3,531.83 | 0.191 | 3630.5 | 177.4 |
| 11 | 0.253 | 3,527.55 | 0.244 | 3,643.00 | 0.239 | 3744.8 | 176.2 |

-continued

TABLES

| | | | | | | | |
|---|---|---|---|---|---|---|---|
| 12 | 0.303 | 3,618.84 | 0.293 | 3,737.28 | 0.287 | 3841.7 | 181.2 |
| 13 | 0.354 | 3,611.14 | 0.342 | 3,729.33 | 0.334 | 3833.6 | 183.3 |
| 14 | 0.404 | 3,627.27 | 0.391 | 3,745.99 | 0.382 | 3850.7 | 183.6 |
| 15 | 0.455 | 3,674.25 | 0.440 | 3,794.50 | 0.430 | 3900.6 | 185.2 |
| 16 | 0.505 | 3,676.00 | 0.489 | 3,796.31 | 0.478 | 3902.4 | 186.4 |
| 17 | 0.556 | 3,689.66 | 0.538 | 3,810.41 | 0.526 | 3916.9 | 186.8 |
| 18 | 0.606 | 3,706.35 | 0.586 | 3,827.65 | 0.573 | 3934.6 | 187.5 |
| 19 | 0.657 | 3,700.00 | 0.635 | 3,821.09 | 0.621 | 3927.9 | 187.8 |
| 20 | 0.707 | 3,647.43 | 0.684 | 3,766.80 | 0.669 | 3872.1 | 186.3 |
| 21 | 0.758 | 3,715.55 | 0.733 | 3,837.16 | 0.717 | 3944.4 | 186.7 |
| 22 | 0.808 | 3,693.53 | 0.782 | 3,814.41 | 0.764 | 3921.0 | 187.9 |
| 23 | 0.859 | 3,733.27 | 0.831 | 3,855.46 | 0.812 | 3963.2 | 188.3 |
| 24 | 0.909 | 3,781.39 | 0.880 | 3,905.14 | 0.860 | 4014.3 | 190.6 |
| 25 | 0.960 | 3,775.71 | 0.928 | 3,899.28 | 0.908 | 4008.3 | 191.6 |
| 26 | 1.010 | 3,801.30 | 0.977 | 3,925.71 | 0.955 | 4035.4 | 192.1 |
| 27 | 1.061 | 3,824.27 | 1.026 | 3,949.43 | 1.003 | 4059.8 | 193.4 |
| 28 | 1.111 | 3,797.49 | 1.075 | 3,921.78 | 1.051 | 4031.4 | 193.3 |
| 29 | 1.162 | 3,834.36 | 1.124 | 3,959.85 | 1.099 | 4070.5 | 193.5 |
| 30 | 1.212 | 3,915.14 | 1.173 | 4,043.27 | 1.147 | 4156.3 | 196.5 |
| 31 | 1.263 | 3,940.86 | 1.222 | 4,069.83 | 1.194 | 4183.6 | 199.2 |
| 32 | 1.313 | 4,040.96 | 1.270 | 4,173.21 | 1.242 | 4289.9 | 202.4 |
| 33 | 1.364 | 4,074.93 | 1.319 | 4,208.30 | 1.290 | 4325.9 | 205.8 |
| 34 | 1.414 | 4,063.28 | 1.368 | 4,196.26 | 1.338 | 4313.6 | 206.4 |
| 35 | 1.465 | 4,099.66 | 1.417 | 4,233.84 | 1.385 | 4352.2 | 207.0 |
| 36 | 1.515 | 4,130.58 | 1.466 | 4,265.77 | 1.433 | 4385.0 | 208.7 |
| 37 | 1.566 | 4,129.93 | 1.515 | 4,265.10 | 1.481 | 4384.3 | 209.5 |
| 38 | 1.616 | 4,189.92 | 1.564 | 4,327.05 | 1.529 | 4448.0 | 211.0 |
| 39 | 1.726 | 4,273.21 | 1.670 | 4,413.06 | 1.633 | 4536.4 | 466.8 |
| 40 | 1.978 | 4,451.79 | 1.914 | 4,597.48 | 1.872 | 4726.0 | 1106.2 |
| 41 | 2.231 | 4,647.76 | 2.159 | 4,799.87 | 2.110 | 4934.0 | 1153.1 |
| 42 | 2.483 | 4,871.53 | 2.403 | 5,030.96 | 2.349 | 5171.6 | 1206.9 |
| 43 | 2.736 | 5,051.45 | 2.647 | 5,216.78 | 2.588 | 5362.6 | 1258.1 |
| 44 | 2.988 | 5,206.37 | 2.892 | 5,376.76 | 2.827 | 5527.0 | 1300.6 |
| 45 | 3.242 | 5,305.15 | 3.137 | 5,478.78 | 3.067 | 5631.9 | 1339.4 |
| 46 | 3.495 | 5,489.14 | 3.381 | 5,668.79 | 3.306 | 5827.2 | 1368.6 |
| 47 | 3.747 | 5,681.13 | 3.626 | 5,867.07 | 3.545 | 6031.1 | 1416.3 |
| 48 | 4.000 | 5,836.90 | 3.870 | 6,027.93 | 3.784 | 6196.4 | 1460.4 |
| 49 | 4.252 | 5,962.77 | 4.114 | 6,157.92 | 4.023 | 6330.0 | 1496.1 |
| 50 | 4.505 | 6,102.04 | 4.359 | 6,301.75 | 4.261 | 6477.9 | 1529.7 |
| 51 | 4.757 | 6,221.14 | 4.603 | 6,424.75 | 4.500 | 6604.3 | 1562.5 |
| 52 | 5.010 | 6,348.82 | 4.847 | 6,556.61 | 4.739 | 6739.9 | 1593.7 |
| 53 | 5.262 | 6,472.96 | 5.092 | 6,684.81 | 4.978 | 6871.7 | 1625.7 |
| 54 | 5.515 | 6,570.59 | 5.336 | 6,785.63 | 5.217 | 6975.3 | 1653.8 |
| 55 | 5.767 | 6,658.00 | 5.580 | 6,875.90 | 5.456 | 7068.1 | 1677.3 |
| 56 | 6.020 | 6,733.25 | 5.825 | 6,953.62 | 5.695 | 7148.0 | 1697.9 |
| 57 | 6.272 | 6,805.90 | 6.069 | 7,028.65 | 5.933 | 7225.1 | 1716.6 |
| 58 | 6.525 | 6,866.23 | 6.313 | 7,090.95 | 6.172 | 7289.1 | 1733.5 |
| 59 | 6.777 | 6,901.65 | 6.558 | 7,127.53 | 6.411 | 7326.8 | 1745.6 |
| 60 | 7.030 | 6,938.85 | 6.802 | 7,165.94 | 6.650 | 7366.2 | 1754.8 |
| 61 | 7.282 | 6,977.69 | 7.046 | 7,206.06 | 6.889 | 7407.5 | 1764.5 |
| 62 | 7.535 | 7,010.89 | 7.291 | 7,240.34 | 7.128 | 7442.7 | 1773.6 |
| 63 | 7.787 | 7,031.28 | 7.535 | 7,261.41 | 7.367 | 7464.4 | 1780.4 |
| 64 | 8.040 | 7,023.78 | 7.779 | 7,253.65 | 7.606 | 7456.4 | 1782.0 |

TABLE MODEL-2 (SHEET 2 OF 2)

| CELL NUMBER ↓ | CELL LETTER → | | | | | | |
|---|---|---|---|---|---|---|---|
| | H | I | J | K | M | N | O |
| 65 | 8.292 | 6,996.90 | 8.024 | 7,225.89 | 7.844 | 7427.9 | 1777.7 |
| 66 | 8.545 | 6,979.37 | 8.268 | 7,207.79 | 8.083 | 7409.3 | 1772.1 |
| 67 | 8.797 | 6,969.38 | 8.512 | 7,197.47 | 8.322 | 7398.7 | 1768.6 |
| 68 | 9.050 | 6,921.69 | 8.757 | 7,148.23 | 8.561 | 7348.0 | 1761.2 |
| 69 | 9.302 | 6,873.51 | 9.001 | 7,098.47 | 8.800 | 7296.9 | 1749.1 |
| 70 | 9.555 | 6,823.18 | 9.245 | 7,046.49 | 9.039 | 7243.5 | 1736.6 |
| 71 | 9.807 | 6,729.20 | 9.490 | 6,949.43 | 9.278 | 7143.7 | 1718.3 |
| 72 | 10.060 | 6,665.66 | 9.734 | 6,883.82 | 9.516 | 7076.2 | 1698.3 |
| 73 | 10.312 | 6,548.90 | 9.978 | 6,763.23 | 9.755 | 6952.3 | 1675.5 |
| 74 | 10.565 | 6,457.58 | 10.223 | 6,668.93 | 9.994 | 6855.3 | 1649.1 |
| 75 | 10.817 | 6,329.87 | 10.467 | 6,537.03 | 10.233 | 6719.8 | 1621.3 |
| 76 | 11.070 | 6,188.04 | 10.711 | 6,390.56 | 10.472 | 6569.2 | 1587.1 |
| 77 | 11.323 | 6,032.53 | 10.955 | 6,229.96 | 10.711 | 6404.1 | 1549.4 |
| 78 | 11.575 | 5,875.80 | 11.200 | 6,068.11 | 10.950 | 6237.7 | 1509.9 |
| 79 | 11.828 | 5,665.66 | 11.444 | 5,851.09 | 11.189 | 6014.6 | 1463.3 |
| 80 | 12.079 | 5,448.07 | 11.687 | 5,626.38 | 11.426 | 5783.6 | 1402.1 |

-continued

TABLES

| | | | | | | | |
|---|---|---|---|---|---|---|---|
| 81 | 12.331 | 5,234.55 | 11.932 | 5,405.87 | 11.665 | 5557.0 | 1354.4 |
| 82 | 12.584 | 4,976.69 | 12.176 | 5,139.56 | 11.904 | 5283.2 | 1294.7 |
| 83 | 12.836 | 4,712.66 | 12.420 | 4,866.90 | 12.143 | 5002.9 | 1228.5 |
| 84 | 13.089 | 4,399.47 | 12.665 | 4,543.45 | 12.382 | 4670.4 | 1155.3 |
| 85 | 13.259 | 4,189.81 | 12.829 | 4,326.94 | 12.543 | 4447.9 | 735.1 |
| 86 | 13.360 | 4,084.16 | 12.927 | 4,217.82 | 12.638 | 4335.7 | 419.6 |
| 87 | 13.461 | 3,990.33 | 13.025 | 4,120.93 | 12.734 | 4236.1 | 409.5 |
| 88 | 13.562 | 3,883.10 | 13.123 | 4,010.18 | 12.830 | 4122.3 | 399.3 |
| 89 | 13.663 | 3,775.66 | 13.220 | 3,899.23 | 12.925 | 4008.2 | 388.4 |
| 90 | 13.764 | 3,684.02 | 13.318 | 3,804.59 | 13.021 | 3910.9 | 378.3 |
| 91 | 13.865 | 3,599.69 | 13.416 | 3,717.50 | 13.116 | 3821.4 | 369.4 |
| 92 | 13.966 | 3,525.16 | 13.514 | 3,640.53 | 13.212 | 3742.3 | 361.3 |
| 93 | 14.067 | 3,408.32 | 13.611 | 3,519.87 | 13.307 | 3618.3 | 351.6 |
| 94 | 14.170 | 3,272.86 | 13.710 | 3,379.98 | 13.404 | 3474.5 | 343.1 |
| 95 | 14.271 | 3,180.17 | 13.808 | 3,284.25 | 13.500 | 3376.0 | 327.3 |
| 96 | 14.372 | 3,082.37 | 13.906 | 3,183.25 | 13.595 | 3272.2 | 317.6 |
| 97 | 14.473 | 2,979.68 | 14.003 | 3,077.20 | 13.691 | 3163.2 | 307.4 |
| 98 | 14.574 | 2,891.83 | 14.101 | 2,986.48 | 13.786 | 3070.0 | 297.8 |
| 99 | 14.675 | 2,822.36 | 14.199 | 2,914.73 | 13.882 | 2996.2 | 289.8 |
| 100 | 14.776 | 2,752.98 | 14.297 | 2,843.08 | 13.977 | 2922.6 | 282.8 |
| 101 | 14.877 | 2,659.90 | 14.394 | 2,746.95 | 14.073 | 2823.7 | 274.5 |
| 102 | 14.978 | 2,587.08 | 14.492 | 2,671.75 | 14.168 | 2746.4 | 266.1 |
| 103 | 15.079 | 2,496.27 | 14.590 | 2,577.97 | 14.264 | 2650.0 | 257.8 |
| 104 | 15.180 | 2,443.23 | 14.688 | 2,523.19 | 14.359 | 2593.7 | 250.5 |
| 105 | 15.281 | 2,369.69 | 14.785 | 2,447.25 | 14.455 | 2515.6 | 244.1 |
| 106 | 15.382 | 2,223.56 | 14.883 | 2,296.33 | 14.551 | 2360.5 | 233.0 |
| 107 | 15.483 | 1,905.31 | 14.981 | 1,967.67 | 14.646 | 2022.7 | 209.4 |
| 108 | 15.584 | 1,335.77 | 15.078 | 1,379.49 | 14.742 | 1418.0 | 164.4 |
| 109 | 15.685 | 711.54 | 15.176 | 734.83 | 14.837 | 755.4 | 103.8 |
| 110 | 15.786 | 333.63 | 15.274 | 344.54 | 14.933 | 354.2 | 53.0 |
| 111 | 15.887 | 180.85 | 15.372 | 186.76 | 15.028 | 192.0 | 26.1 |
| 112 | 15.988 | 106.74 | 15.469 | 110.23 | 15.124 | 113.3 | 14.6 |
| 113 | 16.089 | 46.67 | 15.567 | 48.20 | 15.219 | 49.5 | 7.8 |
| 114 | 16.190 | 17.51 | 15.665 | 18.08 | 15.315 | 18.6 | 3.3 |
| 115 | 16.291 | 22.24 | 15.763 | 22.97 | 15.411 | 23.6 | 2.0 |
| 116 | 16.392 | 12.36 | 15.860 | 12.77 | 15.506 | 13.1 | 1.8 |
| 117 | 16.493 | 9.03 | 15.958 | 9.33 | 15.602 | 9.6 | 1.1 |
| 118 | 16.505 | 9.16 | 15.970 | 9.46 | 15.614 | 9.7 | 0.1 |
| 119 | 16.518 | 10.31 | 15.982 | 10.65 | 15.625 | 10.9 | 0.1 |

TABLE MODEL-3 (SHEET 1 OF 1)

| CELL NUMBER | | | | CELL LETTER → | | | |
|---|---|---|---|---|---|---|---|
| ↓ | P | Q | R | S | V | W | X |
| 17 | | | RUN A | | | RUN B | |
| 18 | | INPUT ACT. TIME SGM — 2.5 | | | INPUT ACT. TIME SGM - −1 | | |
| 19 | | INPUT TOT. IMP. SGM — −0.85 | | | INPUT TOT. IMP. SGM - −1 | | |
| 20 | P | Q | R | S | V | W | |
| 21 | 21 | RM FAMILY | 1 SIGMA | 1 SIGMA | AVG | AVG | |
| 22 | 22 | TEMPERATURE | TOT IMP | ACT TIME | TOT IMP | ACT TIME | |
| 23 | 23 | 120 | 416 | 0.358 | 85519 | 12.908 | |
| 24 | 24 | 0 | 422 | 0.336 | 84400 | 15.549 | |
| 25 | 25 | 28 | 420.6 | 0.341 | 84661 | 14.933 | |
| 26 | SAMPLE RUN | | | | 85909 | 12.503 | |
| 27 | | | | | | | |
| 28 | | | AVG PLUS | AVG PLUS | AVG | AVG | |
| 29 | | AVG PLUS . . . | +3 SIGMA | +3 SIGMA | −3 SIGMA | −3 SIGMA | |
| 30 | | TEMPERATURE | TOT IMP | ACT TIME | TOT IMP | ACT TIME | |
| 31 | | 120 | 86767 | 11.834 | 84271 | 13.982 | |
| 32 | | 0 | 85666 | 14.541 | 83134 | 16.557 | |
| 33 | | 28 | 85922.9 | 13.909367 | 83399.3 | 15.9561667 | |
| 34 | | | | | | | |
| 35 | | | TOT IMP | ACT TIME | | | |
| 36 | | RUN A | 84,303.59 | 15.7856 | | | |
| 37 | | RUN B | 84,240.50 | 15.2739 | | | |
| 99 | 0 | 0 | 0 | 0 | | | |

-continued

TABLES

TABLE MODEL-4 (SHEET 1 OF 1)

| CELL NUMBER ↓ | CELL LETTER → | | | | |
|---|---|---|---|---|---|
| | Z | AA | AB | AC | AD |
| 2 | | TOTAL IMPULSE | | | |
| 3 | ACT. TM. | 95F | 45F | RUN A | RUN B |
| 4 | −0.77 | −0.46 | | | |
| 5 | 0.17 | 0.92 | | | |
| 6 | −2.23 | −1.59 | | | |
| 7 | 0.07 | −1.59 | | | |
| 8 | 0.94 | 0.34 | | | |
| 9 | 0.71 | −0.31 | | | |
| 10 | −0.66 | −0.03 | | | |
| 11 | 0.40 | 0.59 | | | |
| 12 | 1.17 | 1.21 | | | |
| 13 | 0.22 | 0.92 | | | |
| 27 | −1.19 | 1.14 | | | |
| 28 | −1.43 | −0.54 | | | |
| 29 | −0.12 | −1.34 | | | |
| 30 | 0.72 | 1.01 | | | |
| 31 | −0.26 | −1.41 | | | |
| 32 | 0.64 | 1.03 | | | |
| 33 | −0.32 | −0.10 | | | |
| 34 | −0.75 | −1.09 | | | |
| 35 | 2.01 | 0.19 | | | |
| 36 | −0.17 | −0.03 | | | |
| 37 | 0.88 | 1.13 | | | |
| 51 | −2.5 | −0.85 | | | |
| 52 | −1 | −1 | | | |

TABLE MODEL-5 (SHEET 1 OF 1)

| CELL NUMBER ↓ | CELL LETTER → | | | | | | |
|---|---|---|---|---|---|---|---|
| | AH | AI | AJ | AK | AM | AN | AO |
| 1 | 5.731182 | 6.2524 | 254109.9 | 255613.2 | | | |
| 2 | 0.212648 | 0.415906 | 1748.463 | 855.2985 | | | |
| 3 | | | MOD 3 HOT | MOD 3 COLD | | | |
| 4 | 6.574 | 253301 | −0.773 | −0.463 | | | |
| 5 | 6.183 | 255724 | 0.167 | 0.923 | | | |
| 6 | 7.18 | 251338 | −2.230 | −1.585 | | | |
| 7 | 6.225 | 251327 | 0.066 | −1.592 | | | |
| 8 | 5.862 | 254697 | 0.939 | 0.336 | | | |
| 9 | 5.956 | 253563 | 0.713 | −0.313 | | | |
| 10 | 6.528 | 254049 | −0.663 | −0.035 | | | |
| 11 | 6.087 | 255144 | 0.398 | 0.591 | | | |
| 12 | 5.767 | 256233 | 1.167 | 1.214 | | | |
| 13 | 6.162 | 255723 | 0.217 | 0.923 | | | |
| 27 | 5.985 | 256592 | −1.194 | 1.144 | | | |
| 28 | 6.035 | 255154 | −1.429 | −0.537 | | | |
| 29 | 5.757 | 254470 | −0.121 | −1.337 | | | |
| 30 | 5.579 | 256478 | 0.716 | 1.011 | | | |
| 31 | 5.787 | 254404 | −0.262 | −1.414 | | | |
| 32 | 5.596 | 256498 | 0.636 | 1.035 | | | |
| 33 | 5.799 | 255527 | −0.319 | −0.101 | | | |
| 34 | 5.891 | 254678 | −0.752 | −1.093 | | | |
| 35 | 5.303 | 255778 | 2.014 | 0.193 | | | |
| 36 | 5.768 | 255585 | −0.173 | −0.033 | | | |
| 37 | 5.543 | 256581 | 0.885 | 1.132 | | | |

TABLE VALIDATE-1 (SHEET 1 OF 1)

| CELL NUMBER ↓ | CELL LETTER → | | | | |
|---|---|---|---|---|---|
| | A | B | C | D | E |
| 1 | | 15.879 | 84302.6 | 16.306 | 84116.8 |
| 2 | TIME | RUN-A-PREDICTION | RUN-B-PRED | ACTUAL-FIRING | FIRING-2 |

-continued

TABLES

TABLE VALIDATE-2 (SHEET 1 OF 2)

| CELL NUMBER ↓ | CELL LETTER → | | |
|---|---|---|---|
| | A | D | F |
| 3 | 0 | 1789.498 | 0 |
| 4 | 0.06 | 3181.14 | 149.1191 |
| 5 | 0.12 | 3372.058 | 345.7151 |
| 6 | 0.18 | 3266.136 | 544.8609 |
| 7 | 0.24 | 3427.193 | 745.6608 |
| 8 | 0.3 | 3498.993 | 953.4464 |
| 9 | 0.36 | 3566.523 | 1165.412 |
| 10 | 0.42 | 3614.417 | 1380.84 |
| 11 | 0.48 | 3601.878 | 1597.329 |
| 12 | 0.54 | 3803.779 | 1819.499 |
| 13 | 0.6 | 3770.162 | 2046.717 |
| 14 | 0.66 | 3801.426 | 2273.864 |
| 15 | 0.72 | 3868.781 | 2503.971 |
| 16 | 0.78 | 3840.075 | 2735.236 |
| 17 | 0.84 | 3927.07 | 2968.251 |
| 18 | 0.9 | 3911.471 | 3203.407 |
| 19 | 0.96 | 3914.911 | 3438.198 |
| 20 | 1.02 | 3964.566 | 3674.583 |
| 21 | 1.08 | 3994.225 | 3913.346 |
| 22 | 1.14 | 3972.642 | 4152.352 |
| 23 | 1.2 | 3994.234 | 4391.359 |
| 24 | 1.26 | 4063.555 | 4633.092 |
| 25 | 1.32 | 4152.42 | 4879.572 |
| 26 | 1.38 | 4219.501 | 5130.729 |
| 27 | 1.44 | 4241.924 | 5384.572 |
| 28 | 1.5 | 4288.427 | 5640.483 |
| 29 | 1.56 | 4360.486 | 5899.95 |
| 30 | 1.62 | 4377.119 | 6162.078 |
| 31 | 1.823 | 4571.779 | 7070.391 |
| 32 | 2.063 | 4742.492 | 8188.104 |
| 33 | 2.303 | 4959.106 | 9352.296 |
| 34 | 2.543 | 5143.255 | 10564.58 |
| 35 | 2.783 | 5299.584 | 11817.72 |
| 36 | 3.023 | 5425.657 | 13104.75 |
| 37 | 3.263 | 5548.564 | 14421.65 |
| 38 | 3.503 | 5751.696 | 15777.69 |
| 39 | 3.743 | 5928.008 | 17179.25 |
| 40 | 3.983 | 6033.533 | 18614.64 |
| 41 | 4.223 | 6138.174 | 20075.24 |
| 42 | 4.463 | 6261.81 | 21563.24 |
| 43 | 4.703 | 6380.875 | 23080.36 |
| 44 | 4.943 | 6465.396 | 24621.91 |
| 45 | 5.183 | 6559.837 | 26184.94 |
| 46 | 5.423 | 6642.705 | 27769.25 |
| 47 | 5.663 | 6692.865 | 29369.51 |
| 48 | 5.903 | 6755.832 | 30983.36 |
| 49 | 6.143 | 6789.381 | 32608.78 |
| 50 | 6.383 | 6823.701 | 34242.35 |
| 51 | 6.623 | 6858.02 | 35884.16 |
| 52 | 6.863 | 6878.903 | 37532.59 |
| 53 | 7.103 | 6896.279 | 39185.61 |
| 54 | 7.343 | 6910.428 | 40842.42 |
| 55 | 7.583 | 6918.066 | 42501.84 |
| 56 | 7.823 | 6929.832 | 44163.58 |
| 57 | 8.063 | 6908.128 | 45824.14 |
| 58 | 8.303 | 6895.435 | 47480.57 |
| 59 | 8.543 | 6875.359 | 49133.06 |
| 60 | 8.783 | 6817.297 | 50776.18 |

TABLE VALIDATE-2 (SHEET 2 OF 2)

| CELL NUMBER ↓ | CELL LETTER → | | |
|---|---|---|---|
| | A | D | F |
| 61 | 9.023 | 6794.3 | 52409.57 |
| 62 | 9.263 | 6718.686 | 54031.13 |
| 63 | 9.503 | 6646.013 | 55634.9 |
| 64 | 9.743 | 6567.496 | 57220.52 |

TABLES -continued

| | | | |
|---|---|---|---|
| 65 | 9.983 | 6478.645 | 58786.05 |
| 66 | 10.223 | 6371.658 | 60328.09 |
| 67 | 10.463 | 6241.348 | 61841.65 |
| 68 | 10.703 | 6130.12 | 63326.23 |
| 69 | 10.943 | 5991.281 | 64780.79 |
| 70 | 11.183 | 5853.107 | 66202.12 |
| 71 | 11.422 | 5707.016 | 67583.56 |
| 72 | 11.662 | 5550.337 | 68934.44 |
| 73 | 11.902 | 5406.759 | 70249.29 |
| 74 | 12.142 | 5230.997 | 71525.82 |
| 75 | 12.382 | 5037.003 | 72757.98 |
| 76 | 12.622 | 4848.282 | 73944.21 |
| 77 | 12.862 | 4640.779 | 75082.9 |
| 78 | 13.079 | 4434.645 | 76067.59 |
| 79 | 13.179 | 4344.056 | 76506.52 |
| 80 | 13.279 | 4233.412 | 76935.39 |
| 81 | 13.379 | 4120.695 | 77353.1 |
| 82 | 13.479 | 4031.979 | 77760.73 |
| 83 | 13.579 | 3918.179 | 78158.24 |
| 84 | 13.679 | 3841.462 | 78546.22 |
| 85 | 13.779 | 3764.867 | 78926.54 |
| 86 | 13.879 | 3620.794 | 79295.82 |
| 87 | 13.979 | 3498.741 | 79651.8 |
| 88 | 14.079 | 3387.588 | 79996.12 |
| 89 | 14.179 | 3317.358 | 80331.36 |
| 90 | 14.279 | 3234.282 | 80658.94 |
| 91 | 14.379 | 3159.644 | 80978.64 |
| 92 | 14.479 | 3100.237 | 81291.64 |
| 93 | 14.579 | 3046.251 | 81598.96 |
| 94 | 14.679 | 2973.622 | 81899.95 |
| 95 | 14.779 | 2912.912 | 82194.28 |
| 96 | 14.879 | 2833.098 | 82481.58 |
| 97 | 14.979 | 2770.546 | 82761.76 |
| 98 | 15.079 | 2694.998 | 83035.04 |
| 99 | 15.179 | 2592.084 | 83299.39 |
| 100 | 15.279 | 2439.646 | 83550.98 |
| 101 | 15.379 | 2243.769 | 83785.15 |
| 102 | 15.479 | 1947.778 | 83994.73 |
| 103 | 15.579 | 1313.776 | 84157.81 |
| 104 | 15.679 | 589.74 | 84252.98 |
| 105 | 15.779 | 177.729 | 84291.36 |
| 106 | 15.879 | 46.643 | 84302.57 |
| 107 | 15.979 | 45.053 | 84307.16 |
| 108 | 16.079 | 21.655 | 84310.49 |
| 109 | 16.179 | 15.013 | 84312.33 |
| 110 | 16.279 | 13.146 | 84313.74 |
| 111 | 16.316 | 12.991 | 84314.22 |
| 112 | 16.329 | 13.552 | 84314.39 |

TABLE VALIDATE-3 (SHEET 1 OF 2)

| CELL NUMBER ↓ | CELL LETTER → | |
|---|---|---|
| | A | E |
| 114 | 0 | 23.507 |
| 115 | 0.06 | 4877.618 |
| 116 | 0.12 | 2930.171 |
| 117 | 0.18 | 2934.286 |
| 118 | 0.24 | 3639.649 |
| 119 | 0.3 | 3534.911 |
| 120 | 0.36 | 3771.07 |
| 121 | 0.42 | 3623.208 |
| 122 | 0.48 | 3804.055 |
| 123 | 0.54 | 3695.676 |
| 124 | 0.6 | 3752.228 |
| 125 | 0.66 | 3616.953 |
| 126 | 0.72 | 3746.788 |
| 127 | 0.78 | 3701.782 |
| 128 | 0.84 | 3773.622 |
| 129 | 0.9 | 3705.781 |
| 130 | 0.96 | 3734.724 |
| 131 | 1.02 | 3708.448 |
| 132 | 1.08 | 3751.623 |
| 133 | 1.14 | 3798.879 |
| 134 | 1.2 | 3860.816 |

TABLES

-continued

| | | |
|---|---|---|
| 135 | 1.26 | 3922.544 |
| 136 | 1.32 | 3937.614 |
| 137 | 1.38 | 4052.326 |
| 138 | 1.44 | 4129.033 |
| 139 | 1.5 | 4113.593 |
| 140 | 1.56 | 4129.805 |
| 141 | 1.62 | 4213.624 |
| 142 | 1.688 | 4279.714 |
| 143 | 1.928 | 4478.225 |
| 144 | 2.168 | 4674.714 |
| 145 | 2.408 | 4877.043 |
| 146 | 2.648 | 5083.075 |
| 147 | 2.888 | 5272.688 |
| 148 | 3.128 | 5404.415 |
| 149 | 3.368 | 5525.807 |
| 150 | 3.608 | 5693.459 |
| 151 | 3.848 | 5845.533 |
| 152 | 4.088 | 5958.229 |
| 153 | 4.328 | 6054.521 |
| 154 | 4.568 | 6146.695 |
| 155 | 4.808 | 6238.25 |
| 156 | 5.048 | 6315.441 |
| 157 | 5.288 | 6402.707 |
| 158 | 5.528 | 6472.427 |
| 159 | 5.768 | 6517.858 |
| 160 | 6.008 | 6543.489 |
| 161 | 6.248 | 6567.816 |
| 162 | 6.488 | 6601.521 |
| 163 | 6.728 | 6618.387 |
| 164 | 6.968 | 6643.2 |
| 165 | 7.208 | 6644.934 |
| 166 | 7.448 | 6640.822 |
| 167 | 7.688 | 6638.27 |
| 168 | 7.928 | 6649.368 |
| 169 | 8.168 | 6620.471 |
| 170 | 8.408 | 6616.338 |
| 171 | 8.648 | 6609.043 |

TABLE VALIDATE-3 (SHEET 2 OF 2)

| CELL NUMBER | CELL LETTER → | |
|---|---|---|
| ↓ | A | E |
| 172 | 8.888 | 6546.585 |
| 173 | 9.128 | 6504.96 |
| 174 | 9.368 | 6453.06 |
| 175 | 9.608 | 6386.623 |
| 176 | 9.848 | 6321.52 |
| 177 | 10.088 | 6258.42 |
| 178 | 10.328 | 6155.253 |
| 179 | 10.568 | 6060.758 |
| 180 | 10.808 | 5948.686 |
| 181 | 11.048 | 5836.548 |
| 182 | 11.288 | 5727.359 |
| 183 | 11.527 | 5603.823 |
| 184 | 11.767 | 5456.346 |
| 185 | 12.007 | 5313.603 |
| 186 | 12.247 | 5167.506 |
| 187 | 12.487 | 5036.076 |
| 188 | 12.727 | 4873.351 |
| 189 | 12.967 | 4711.557 |
| 190 | 13.207 | 4538.828 |
| 191 | 13.406 | 4381.565 |
| 192 | 13.506 | 4316.226 |
| 193 | 13.606 | 4231.313 |
| 194 | 13.706 | 4153.382 |
| 195 | 13.806 | 4099.995 |
| 196 | 13.906 | 4027.798 |
| 197 | 14.006 | 3926.528 |
| 198 | 14.106 | 3847.005 |
| 199 | 14.206 | 3747.344 |
| 200 | 14.306 | 3648.325 |
| 201 | 14.406 | 3504.494 |
| 202 | 14.506 | 3411.491 |
| 203 | 14.606 | 3302.675 |

TABLES

-continued

| | | |
|---|---|---|
| 204 | 14.706 | 3243.309 |
| 205 | 14.806 | 3169.518 |
| 206 | 14.906 | 3105.103 |
| 207 | 15.006 | 3050.379 |
| 208 | 15.106 | 2969.907 |
| 209 | 15.206 | 2918.328 |
| 210 | 15.306 | 2857.869 |
| 211 | 15.406 | 2765.32 |
| 212 | 15.506 | 2669.736 |
| 213 | 15.606 | 2537.298 |
| 214 | 15.706 | 2327.617 |
| 215 | 15.806 | 2039.571 |
| 216 | 15.906 | 1521.715 |
| 217 | 16.006 | 851.957 |
| 218 | 16.106 | 338.794 |
| 219 | 16.206 | 137.009 |
| 220 | 16.306 | 56.529 |
| 221 | 16.406 | 26.995 |
| 222 | 16.444 | 22.444 |
| 223 | 16.456 | 23.454 |
| 224 | 16.469 | 20.407 |
| 225 | 16.519 | 19.614 |
| 226 | 16.569 | 15.024 |
| 227 | 16.61 | 13.943 |
| 228 | 16.669 | 11.276 |
| 229 | 16.719 | 13.617 |
| 230 | 16.731 | 10.371 |

TABLE VALIDATE-4 (SHEET 1 OF 2)

| CELL NUMBER ↓ | CELL LETTER → | |
|---|---|---|
| | A | B |
| 232 | 0 | 0 |
| 233 | 0.050502 | 5829.372477 |
| 234 | 0.101004 | 4274.873149 |
| 235 | 0.151505 | 3575.348452 |
| 236 | 0.202007 | 3419.89852 |
| 237 | 0.252509 | 3527.54694 |
| 238 | 0.303011 | 3618.839397 |
| 239 | 0.353513 | 3611.140201 |
| 240 | 0.404014 | 3627.27429 |
| 241 | 0.454516 | 3674.251439 |
| 242 | 0.505018 | 3676.001506 |
| 243 | 0.55552 | 3689.657903 |
| 244 | 0.606022 | 3706.345572 |
| 245 | 0.656523 | 3700.000644 |
| 246 | 0.707025 | 3647.429032 |
| 247 | 0.757527 | 3715.554187 |
| 248 | 0.808029 | 3693.525377 |
| 249 | 0.858531 | 3733.273148 |
| 250 | 0.909032 | 3781.385679 |
| 251 | 0.959534 | 3775.712534 |
| 252 | 1.010036 | 3801.297261 |
| 253 | 1.060538 | 3824.273539 |
| 254 | 1.11104 | 3797.490292 |
| 255 | 1.161541 | 3834.362239 |
| 256 | 1.212043 | 3915.138688 |
| 257 | 1.262545 | 3940.857102 |
| 258 | 1.313047 | 4040.957531 |
| 259 | 1.363549 | 4074.932669 |
| 260 | 1.41405 | 4063.275478 |
| 261 | 1.464552 | 4099.662421 |
| 262 | 1.515054 | 4130.584522 |
| 263 | 1.565556 | 4129.930078 |
| 264 | 1.616058 | 4189.918984 |
| 265 | 1.725899 | 4273.205949 |
| 266 | 1.978408 | 4451.786054 |
| 267 | 2.230917 | 4647.76023 |
| 268 | 2.483426 | 4871.527299 |
| 269 | 2.735935 | 5051.453601 |
| 270 | 2.988444 | 5206.366454 |
| 271 | 3.242216 | 5305.148668 |
| 272 | 3.494725 | 5489.139986 |
| 273 | 3.747234 | 5681.132312 |

-continued

TABLES

| | | |
|---|---|---|
| 274 | 3.999743 | 5836.899362 |
| 275 | 4.252252 | 5962.774168 |
| 276 | 4.504761 | 6102.039431 |
| 277 | 4.75727 | 6221.143615 |
| 278 | 5.009779 | 6348.824749 |
| 279 | 5.262288 | 6472.96007 |
| 280 | 5.514797 | 6570.588068 |
| 281 | 5.767306 | 6657.995234 |
| 282 | 6.019815 | 6733.252432 |
| 283 | 6.272324 | 6805.903513 |
| 284 | 6.524833 | 6866.226637 |
| 285 | 6.777342 | 6901.650567 |
| 286 | 7.02985 | 6938.848959 |
| 287 | 7.282359 | 6977.694343 |
| 288 | 7.534868 | 7010.890676 |
| 289 | 7.787377 | 7031.28493 |
| 290 | 8.039886 | 7023.775921 |
| 291 | 8.292395 | 6996.898627 |

TABLE VALIDATE-4 (SHEET 2 OF 2)

| CELL NUMBER ↓ | CELL LETTER → | |
|---|---|---|
| | A | B |
| 292 | 8.544904 | 6979.371647 |
| 293 | 8.797413 | 6969.379326 |
| 294 | 9.049922 | 6921.694282 |
| 295 | 9.302431 | 6873.511021 |
| 296 | 9.55494 | 6823.180996 |
| 297 | 9.807449 | 6729.199075 |
| 298 | 10.05996 | 6665.66047 |
| 299 | 10.31247 | 6548.896585 |
| 300 | 10.56498 | 6457.58374 |
| 301 | 10.81749 | 6329.866075 |
| 302 | 11.06999 | 6188.040552 |
| 303 | 11.3225 | 6032.529994 |
| 304 | 11.57501 | 5875.801485 |
| 305 | 11.82752 | 5665.661934 |
| 306 | 12.07877 | 5448.074 |
| 307 | 12.33128 | 5234.551859 |
| 308 | 12.58379 | 4976.68607 |
| 309 | 12.83629 | 4712.660577 |
| 310 | 13.0888 | 4399.465493 |
| 311 | 13.25925 | 4189.810946 |
| 312 | 13.36025 | 4084.155513 |
| 313 | 13.46125 | 3990.331375 |
| 314 | 13.56226 | 3883.095016 |
| 315 | 13.66326 | 3775.655795 |
| 316 | 13.76427 | 3684.0235 |
| 317 | 13.86527 | 3599.68958 |
| 318 | 13.96627 | 3525.15911 |
| 319 | 14.06728 | 3408.322163 |
| 320 | 14.16954 | 3272.862314 |
| 321 | 14.27055 | 3180.168297 |
| 322 | 14.37155 | 3082.373967 |
| 323 | 14.47255 | 2979.680632 |
| 324 | 14.57356 | 2891.832766 |
| 325 | 14.67456 | 2822.357528 |
| 326 | 14.77556 | 2752.982555 |
| 327 | 14.87657 | 2659.896803 |
| 328 | 14.97757 | 2587.075505 |
| 329 | 15.07857 | 2496.270981 |
| 330 | 15.17958 | 2443.22991 |
| 331 | 15.28058 | 2369.689656 |
| 332 | 15.38159 | 2223.557392 |
| 333 | 15.48259 | 1905.310963 |
| 334 | 15.58359 | 1335.768059 |
| 335 | 15.6846 | 711.5448632 |
| 336 | 15.7856 | 333.6258683 |
| 337 | 15.8866 | 180.845011 |
| 338 | 15.98761 | 106.7365873 |
| 339 | 16.08861 | 46.67306505 |
| 340 | 16.18961 | 17.51065767 |
| 341 | 16.29062 | 22.24177637 |
| 342 | 16.39162 | 12.36293315 |

TABLES

-continued

| | | |
|---|---|---|
| 343 | 16.49263 | 9.030086591 |
| 344 | 16.50525 | 9.161441784 |
| 345 | 16.51788 | 10.31410304 |

TABLE VALIDATE-5 (SHEET 1 OF 2)

| CELL NUMBER | CELL LETTER → | |
|---|---|---|
| ↓ | A | C |
| 347 | 0 | 0 |
| 348 | 0.048865 | 6020.157089 |
| 349 | 0.09773 | 4414.781865 |
| 350 | 0.146594 | 3692.363014 |
| 351 | 0.195459 | 3531.825492 |
| 352 | 0.244324 | 3642.997047 |
| 353 | 0.293189 | 3737.277338 |
| 354 | 0.342053 | 3729.326161 |
| 355 | 0.390918 | 3745.988289 |
| 356 | 0.439783 | 3794.502914 |
| 357 | 0.488648 | 3796.310257 |
| 358 | 0.537512 | 3810.413602 |
| 359 | 0.586377 | 3827.647429 |
| 360 | 0.635242 | 3821.094843 |
| 361 | 0.684107 | 3766.802658 |
| 362 | 0.732971 | 3837.157425 |
| 363 | 0.781836 | 3814.407652 |
| 364 | 0.830701 | 3855.456294 |
| 365 | 0.879566 | 3905.14346 |
| 366 | 0.92843 | 3899.284643 |
| 367 | 0.977295 | 3925.706711 |
| 368 | 1.02616 | 3949.43496 |
| 369 | 1.075025 | 3921.775147 |
| 370 | 1.123889 | 3959.853845 |
| 371 | 1.172754 | 4043.273958 |
| 372 | 1.221619 | 4069.834088 |
| 373 | 1.270484 | 4173.21062 |
| 374 | 1.319348 | 4208.297701 |
| 375 | 1.368213 | 4196.258992 |
| 376 | 1.417078 | 4233.836813 |
| 377 | 1.465943 | 4265.770937 |
| 378 | 1.514807 | 4265.095074 |
| 379 | 1.563672 | 4327.047306 |
| 380 | 1.669953 | 4413.0601 |
| 381 | 1.914277 | 4597.484803 |
| 382 | 2.1586 | 4799.872852 |
| 383 | 2.402924 | 5030.963405 |
| 384 | 2.647248 | 5216.778363 |
| 385 | 2.891572 | 5376.761228 |
| 386 | 3.137117 | 5478.776402 |
| 387 | 3.381441 | 5668.789416 |
| 388 | 3.625765 | 5867.065296 |
| 389 | 3.870088 | 6027.930315 |
| 390 | 4.114412 | 6157.924771 |
| 391 | 4.358736 | 6301.74793 |
| 392 | 4.60306 | 6424.750174 |
| 393 | 4.847383 | 6556.610076 |
| 394 | 5.091707 | 6684.808117 |
| 395 | 5.336031 | 6785.6313 |
| 396 | 5.580355 | 6875.899141 |
| 397 | 5.824678 | 6953.619369 |
| 398 | 6.069002 | 7028.648185 |
| 399 | 6.313326 | 7090.945573 |
| 400 | 6.55765 | 7127.528864 |
| 401 | 6.801974 | 7165.94469 |
| 402 | 7.046297 | 7206.061412 |
| 403 | 7.290621 | 7240.3442 |
| 404 | 7.534945 | 7261.40592 |
| 405 | 7.779269 | 7253.651155 |
| 406 | 8.023592 | 7225.894217 |

-continued

TABLES

TABLE VALIDATE-5 (SHEET 2 OF 2)

| CELL NUMBER ↓ | A | C |
|---|---|---|
| 407 | 8.267916 | 7207.793612 |
| 408 | 8.51224 | 7197.47426 |
| 409 | 8.756564 | 7148.228572 |
| 410 | 9.000887 | 7098.468362 |
| 411 | 9.245211 | 7046.491128 |
| 412 | 9.489535 | 6949.433353 |
| 413 | 9.733859 | 6883.815246 |
| 414 | 9.978182 | 6763.229894 |
| 415 | 10.22251 | 6668.928548 |
| 416 | 10.46683 | 6537.03092 |
| 417 | 10.71115 | 6390.563708 |
| 418 | 10.95548 | 6229.963577 |
| 419 | 11.1998 | 6068.105633 |
| 420 | 11.44413 | 5851.088602 |
| 421 | 11.68723 | 5626.379416 |
| 422 | 11.93155 | 5405.869089 |
| 423 | 12.17587 | 5139.563828 |
| 424 | 12.4202 | 4866.897268 |
| 425 | 12.66452 | 4543.451886 |
| 426 | 12.82944 | 4326.935733 |
| 427 | 12.92717 | 4217.822392 |
| 428 | 13.0249 | 4120.927562 |
| 429 | 13.12263 | 4010.181555 |
| 430 | 13.22036 | 3899.226047 |
| 431 | 13.31809 | 3804.594796 |
| 432 | 13.41582 | 3717.500782 |
| 433 | 13.51355 | 3640.531067 |
| 434 | 13.61128 | 3519.870263 |
| 435 | 13.71023 | 3379.977063 |
| 436 | 13.80796 | 3284.249341 |
| 437 | 13.90569 | 3183.254383 |
| 438 | 14.00342 | 3077.200085 |
| 439 | 14.10115 | 2986.47712 |
| 440 | 14.19888 | 2914.728086 |
| 441 | 14.2966 | 2843.082597 |
| 442 | 14.39433 | 2746.950321 |
| 443 | 14.49206 | 2671.745716 |
| 444 | 14.58979 | 2577.969328 |
| 445 | 14.68752 | 2523.19232 |
| 446 | 14.78525 | 2447.245228 |
| 447 | 14.88298 | 2296.330325 |
| 448 | 14.98071 | 1967.668277 |
| 449 | 15.07844 | 1379.485284 |
| 450 | 15.17617 | 734.8324145 |
| 451 | 15.2739 | 344.5448278 |
| 452 | 15.37163 | 186.7637347 |
| 453 | 15.46936 | 110.229879 |
| 454 | 15.56709 | 48.2005884 |
| 455 | 15.66482 | 18.08374921 |
| 456 | 15.76255 | 22.9697087 |
| 457 | 15.86028 | 12.76754915 |
| 458 | 15.95801 | 9.325624674 |
| 459 | 15.97022 | 9.46127888 |
| 460 | 15.98244 | 10.65166461 |

I claim:

1. A method for deriving a simulated thrust-versus-time profile for a specific type of rocket motor operating at a chosen motor temperature, comprising the steps of A. Test-firing a rocket motor of the specific type at a first motor temperature and measuring values for a first complete thrust-versus-time profile at that first temperature, the profile being defined by a time axis and a thrust axis, wherein total impulse of the motor during the test firing is shown by the area under the thrust-versus-time profile over the entire action (running) time of the motor, B. Test-firing a rocket motor of the specific type at respectively extremely high and extremely low motor temperatures to measure two sets of values for total impulse and total action time for the respective high and low temperatures, C. Interpolating the chosen motor temperature between the high and low extreme motor temperatures to derive interpolated values of total impulse and total action time at the chosen motor temperature, and D. Creating a derived thrust-versus-time profile for the specific rocket motor type at the chosen temperature by multiplying the value on the time axis of the first profile by a factor which compresses or expands the profile as necessary on the time axis to make the total action time used in the derived profile equal to the derived action time and multiplying the value on the thrust axis of the first profile by a value which compresses or expands the profile as necessary on the thrust axis to make the total impulse shown under the curve of the derived profile equal to the derived total impulse, whereby the resulting derived profile which has been compressed and expanded as necessary on those two axes is a good approximation of the profile which would be derived by running and plotting a complete test firing at the chosen motor temperature.

2. A method for generating thrust-versus-time curves for a solid propellant rocket motor operating at any desired temperature between the extreme high and extreme low allowable operating temperatures, and at a given performance level, comprising the steps of A. Defining a performance envelope of a rocket motor based on total impulse and action time at each of the two extreme operating temperatures, in terms of the average total impulse and average action time at the extreme temperatures and the standard deviation seen in production for these values, B. Obtaining two sets of ballistic thrust-versus-time data from similar rocket motors fired at the two extreme temperatures of operation, C. Using the data from one of these two sets of motors as a sample run to obtain a baseline curve defining the shape of the curve of the model and using the data from the other one of the two sets of motors to verify the accuracy of the model predictions, D. Determining the total impulse and action time of the rocket motor at the given performance level for both extreme operating temperatures, and linearly interpolating between these two values of total impulse and action time to solve for the desired temperature and thus to provide the values of total impulse and action time for the desired temperature and performance level, E. Creating a derived thrust-versus-time curve for the specific rocket motor type at the chosen temperature and specified level of performance by multiplying the value on the time axis of the baseline curve by a factor which compresses or expands the baseline time data as necessary to force the duration of the firing to the right value as previously calculated by interpolation, and F. Multiplying the value on the thrust axis of the baseline curve by a value which compresses or expands the thrust values as necessary to make the total impulse as described by the area under the thrust-time curve equal to the total impulse value previously obtained by interpolation, whereby there is obtained a ballistic curve for the desired temperature that has the same area under the curve and the same time duration as that previously obtained by interpolation.

3. A method for obtaining a thrust versus time profile for a rocket motor operating at a chosen motor temperature, comprising the steps of:

A. Creating a thrust versus time profile for the rocket motor at a first motor temperature over a first total action time of the rocket motor by obtaining thrust versus time values for the rocket motor at a first motor temperature wherein an area created by the thrust versus time profile equals a first total impulse;

B. Obtaining values for total impulse and total action time for the rocket motor at extremely high and extremely low motor temperatures;

C. Interpolating the chosen motor temperature between the extremely high and extremely low motor temperatures to derive values of total impulse and total action time at the chosen motor temperature; and, D. Creating a derived thrust versus time profile for the rocket motor at the chosen temperature by multiplying the value of time on the thrust versus time profile at the first motor temperature by a factor which compresses or expands the profile wherein the first total action time equals the derived total action time and multiplying the value of thrust on the thrust versus time profile at the first motor temperature by a factor which compresses or expands the profile wherein the first total impulse equals the derived total impulse.

* * * * *